(12) United States Patent
Baughman et al.

(10) Patent No.: US 11,538,464 B2
(45) Date of Patent: Dec. 27, 2022

(54) SPEECH RECOGNITION USING DATA ANALYSIS AND DILATION OF SPEECH CONTENT FROM SEPARATED AUDIO INPUT

(71) Applicant: International Business Machines Corporation, Armonk, NY (US)

(72) Inventors: Aaron K. Baughman, Cary, NC (US); Corey B. Shelton, Marietta, GA (US); Stephen C. Hammer, Marietta, GA (US); Shikhar Kwatra, Raleigh, NC (US)

(73) Assignee: International Business Machines Corporation ., Armonk, NY (US)

( * ) Notice: Subject to any disclaimer, the term of this patent is extended or adjusted under 35 U.S.C. 154(b) by 28 days.

(21) Appl. No.: 17/016,360

(22) Filed: Sep. 9, 2020

(65) Prior Publication Data

US 2022/0076665 A1   Mar. 10, 2022

(51) Int. Cl.
  *G10L 15/16* (2006.01)
  *G10L 21/0272* (2013.01)
  *G10L 25/03* (2013.01)
(52) U.S. Cl.
  CPC .......... *G10L 15/16* (2013.01); *G10L 21/0272* (2013.01); *G10L 25/03* (2013.01)
(58) Field of Classification Search
  CPC ..... G10L 15/00; G10L 15/16; G10L 21/0272; G06N 3/08; G06F 3/16
  See application file for complete search history.

(56) References Cited

U.S. PATENT DOCUMENTS

| 7,047,196 B2 | 5/2006 | Calderone |
| 7,885,966 B2 | 2/2011 | Wolman |
| 8,020,104 B2 | 9/2011 | Robarts |

(Continued)

FOREIGN PATENT DOCUMENTS

| CN | 110459240 A | 11/2019 |
| CN | 110751957 A | 2/2020 |

(Continued)

OTHER PUBLICATIONS

Saon, George, et al. "English conversational telephone speech recognition by humans and machines." arXiv preprint arXiv: 1703. 02136 (2017). (Year: 2017).*

(Continued)

*Primary Examiner* — Paras D Shah
(74) *Attorney, Agent, or Firm* — Michael A. Petrocelli

(57) ABSTRACT

The disclosure includes using dilation of speech content from a separated audio input for speech recognition. An audio input from a speaker and predicted changes for the audio input based on an external noise are received at a CNN (Convolutional Neural Network). In the CNN, diarization is applied to the audio input to predict how a dilation of speech content from the speaker changes the audio input to generate a CNN output. A resulting dilation is determined from the CNN output. A word error rate is determined for the dilated CNN output to determine an accuracy for speech to text outputs. An adjustment parameter is set to change a range of the dilation based on the word error rate, and the resulting dilation of the CNN output is adjusted based on the adjustment parameter to reduce the word error rate.

25 Claims, 16 Drawing Sheets

(56) References Cited

U.S. PATENT DOCUMENTS

| | | |
|---|---|---|
| 10,586,531 B2 | 3/2020 | van den Oord et al. |
| 2019/0043516 A1 | 2/2019 | Germain et al. |
| 2019/0341050 A1 | 11/2019 | Diamant |
| 2020/0051582 A1 | 2/2020 | Gilson |
| 2020/0111495 A1 | 4/2020 | Ziv |
| 2020/0320974 A1 | 10/2020 | McCord |
| 2022/0076664 A1 | 3/2022 | Baughman |

FOREIGN PATENT DOCUMENTS

| | | |
|---|---|---|
| CN | 111191000 A | 5/2020 |
| CN | 111326178 A | 6/2020 |
| CN | 111508487 A | 8/2020 |
| CN | 111508524 A | 8/2020 |
| WO | 2017112813 A1 | 6/2017 |
| WO | 2018224690 A1 | 12/2018 |
| WO | 2020146042 A1 | 7/2020 |

OTHER PUBLICATIONS

Wang, Quan, et al. "Voicefilter: Targeted voice separation by speaker-conditioned spectrogram masking." arXiv preprint arXiv: 1810.04826 (2018). (Year: 2018).*

Han, Kyu J., Ramon Prieto, and Tao Ma. "State-of-the-art speech recognition using multi-stream self-attention with dilated 1d convolutions." 2019 IEEE Automatic Speech Recognition and Understanding Workshop (ASRU). IEEE, 2019. (Year: 2019).*

Seo, Jungwon. Minimum Word Error Rate Training for Speech Separation. MS thesis. University of Stavanger, Norway, 2019. (Year : 2019).*

Jafarlou, Salar, et al. "Analyzing large receptive field convolutional networks for distant speech recognition." 2019 IEEE Automatic Speech Recognition and Understanding Workshop (ASRU). IEEE, 2019. (Year: 2019).*

Pan, Jing, et al. "ASAPP-ASR: multistream CNN and self-attentive SRU for SOTA speech recognition." arXiv preprint arXiv: 2005. 10469 (2020). (Year: 2020).*

Araujo, et al., "An Evolutionary Approach to Design Dilation-Erosion Perceptrons for Stock Market Indices Forecasting", GECCO '11: Proceedings of the 13th annual conference on Genetic and evolutionary computation, Jul. 2011, pp. 1651-1658, <https://doi.org/10.1145/2001576.2001799>.

Baughman, et al., "Speech Recognition Using Data Analysis and Dilation of Interlaced Audio Input", U.S. Appl. No. 17/015,510, filed Sep. 9, 2020.

De Bruin, et al., Automatic Language Recognition based on Discriminating Features in Pitch Contours, 1993 IEEE South African Symposium on Communications and Signal Processing, pp. 133-138, <https://ieeexplore.IEEE.org/document/365857>.

List of IBM Patents or Patent Applications Treated as Related. Filed Herewith. 2 pages.

Lu, et al., "SCAN: Learning Speaker Identity From Noisy Sensor Data", IPSN '17: Proceedings of the 16th ACM/IEEE International Conference on Information Processing in Sensor Networks, Apr. 2017, pp. 67-78, <https://doi.org/10.1145/3055031.3055073>.

Mell et al., "The NIST Definition of Cloud Computing", National Institute of Standards and Technology, Special Publication 800-145, Sep. 2011, 7 pages.

Sushma, et al., "Text Detection in Color Images", 2009 International Conference on Intelligent Agent & Multi-Agent Systems, 6 pages, <https://ieeexplore.ieee.org/document/5228049>.

Tan, et al., "Gated Residual Networks With Dilated Convolutions for Monaural Speech Enhancement", IEEE/ACM Transactions on Audio, Speech and Language Processing (TASLP), vol. 27, Issue 1, Jan. 2019, pp. 189-198, <https://doi.org/10.1109/TASLP.2018. 2876171>.

Wu, et al., "RESTFul: Resolution-Aware Forecasting of Behavioral Time Series Data", CIKM '18: Proceedings of the 27th ACM International Conference on Information and Knowledge Management, Oct. 2018, pp. 1073-1082, <https://doi.org/10.1145/3269206. 3271794>.

International Search Report and Written Opinion, International Application No. PCT/EP2021/073412, dated Dec. 23, 2021, 9 pages.

International Search Report and Written Opinion, International Application No. PCT/IB2021/057756, dated Nov. 25, 2021, 12 pages.

Zhang, et al: "On End-to-End Multi-Channel Time Domain Speech Separation in Reverberant Environments", CASSP 2020, May 4, 2020, pp. 6389-6393.

Baughman, et al., "Speech Recognition Using Data Analysis and Dilation of Interlaced Audio Input", International Application No. PCT/IB2021/057756, International Filing Date Aug. 24, 2021, 42 pages.

Baughman, et al., "Speech Recognition Using Data Analysis and Dilation of Speech Content From Separated Audio Input", International Application No. PCT/EP2021/073412, International Filing Date Aug. 24, 2021, 56 pages.

* cited by examiner

SPEECH RECOGNITION USING DATA ANALYSIS AND DILATION OF SPEECH CONTENT FROM SEPARATED AUDIO INPUT

BACKGROUND

The present disclosure relates to techniques, using a computer, for speech recognition of speech content from an audio input. More particularly, the audio input includes separated speech content from an audio input.

Techniques, using a computer, can be used to translate human speech to text. Human speech can include, for example, spoken words, singing, singularly or in a group. During human speech, the translation of a speech output or a speech output signal being translated to text can be challenging. For example, speech recognition and translation can be challenging when sounds are changed or less common than typical phonetics of words. For example, sounds can be elongated or intermixed with other noise or noises. In one example, there may be background noise when a speaker is speaking. In another example, a group of speakers may be speaking and there can be overlap of speakers. In another example, background noise may occur when one or more speakers are speaking. In another example, a speaker may change the typical phonetics of one or more words unintentionally, or intentionally for emphasis, or as part of an unorthodox or atypical speech pattern, or as part of an accent. Such changed and/or atypical sounds when a speaker speaks results in challenging speech for speech identification and translation from speech to text.

SUMMARY

The present disclosure recognizes the shortcomings and problems associated with current techniques for speech recognition using dilation of speech content from an interlaced audio input.

The present invention analyzes speech content from an interlaced audio input for speech recognition of each of a plurality of speakers and can provide translation to text from the speech content. For example, the challenges of speech recognition and translation when sounds are changed or less common than typical phonetics of words can be overcome using the present invention, when speech content includes changed and/or atypical sounds from a speaker for translation from speech to text.

One problem, for example, can occur when an artist is singing a song, some of the words can be changed or altered in a way that follows harmonics rather than common phonetics. In another example, in a noisy environment, the mixing of sound waves and sounds can cause word error rates to increase when translating. For example, at large events, a large crowd roar or sporting event sounds can occlude the speech signal.

The present invention includes speech recognition using dilation of a speech signal, speech input, to increase the space between samples or speech samplings before attempting to recognize a word or analyzing speech content to recognize a word or words. In one example according to the present invention, a Convolutional Neural Network (CNN) with different dilation parameters can be trained and applied to these problems. Further, forecasted environmental noise and speech type can indicate which dilation to use. In addition, in another example, each speaker can be assigned a dilation parameter through machine learning. In a group setting of a conversation or song, the dilation of the parameters can be weighted together by the group based on the amplitude of each speaker.

The present invention includes forecasting each human speaker's audio signal or speech content into the future. In one example, the present invention can forecast how a speaker's audio signal or speech content will change based on an external noise. An output can be input into a CNN without dilation to predict how a dilation of the speech content would change based on a future trend. A resulting dilation can be determined and applied to speech to text conversion.

In an aspect according to the present invention, a computer-implemented method for speech recognition uses dilation of speech content from a separated audio input which includes receiving an audio input, and receiving predicted changes for the audio input based on an external noise, at a CNN (Convolutional Neural Network), the audio input having speech content from a speaker. The method includes applying, in the CNN, diarization to the audio input to predict how a dilation of speech content from the speaker changes the audio input to generate a CNN output. A resulting dilation from the CNN output is determined, the resulting dilation of the CNN output includes separating the sounds of the audio input. A word error rate for the dilated CNN output is determined to determine an accuracy for speech to text outputs. An adjustment parameter is set to change a range of the dilation based on the word error rate. The method includes adjusting the resulting dilation of the CNN output based on the adjustment parameter to reduce the word error rate.

One advantage of the present invention includes reducing word error rates when translating speech content from a separated audio input for converting speech from an audio input to text using speech recognition using a method according to the present invention.

In a related aspect, the method of claim 1 further includes: identifying speech content from the speaker from the audio input based on the learning modifications applied to the adjusted resulting dilating for the speaker.

In a related aspect, the method includes generating text from the identified speech content.

In a related aspect, the audio input and the predicted changes are received without dilation of the speech content.

In a related aspect, the method includes adjusting the resulting dilating of the audio input based on the word error rate using a grid search to reduce the word error rate.

In a related aspect, the method includes: receiving, at a computer, a forecast audio input for a speaker, the forecast audio input including speech content for the speaker; generating an environmental stimulus audio input for the forecast audio input; and predicting changes of the audio input for the speaker based on environmental stimulus audio input.

In a related aspect, the method further includes: sharing the adjusted resulting dilating of the forecast audio input with a social network; generating learning modifications from the sharing of the adjusted resulting dilating of the forecast audio input; applying the learning modifications to the adjusted resulting dilating for the speaker; identifying speech content from the speaker from the audio input based on the learning modifications applied to the adjusted resulting dilating for the speaker; and generating text from the identified speech content.

In a related aspect, the method further includes: sharing the adjusted resulting dilating of the forecast audio input with a social network; generating learning modifications from the sharing of the adjusted resulting dilating of the forecast audio input; and applying the learning modifications to the adjusted resulting dilating for the speaker.

In a related aspect, the method further includes: identifying speech content from the speaker from the audio input based on the learning modifications applied to the adjusted resulting dilating for the speaker.

In a related aspect, the method further includes generating text from the identified speech content.

In a related aspect, the method further includes: receiving dilation parameters for speech content of one of a plurality of speakers at the CNN, the dilation parameters derived from an audio input from a plurality of speakers.

In a related aspect, the audio input from the plurality of speakers is an interlaced audio input.

In another aspect according to the present invention, a system for speech recognition uses dilation of speech content from a separated audio input which includes a computer system. The computer system includes; a computer processor, a computer-readable storage medium, and program instructions stored on the computer-readable storage medium being executable by the processor, to cause the computer system to perform the following functions to; receive an audio input, and receiving predicted changes for the audio input based on an external noise, at a CNN (Convolutional Neural Network), the audio input having speech content from a speaker; apply, in the CNN, diarization to the audio input to predict how a dilation of speech content from the speaker changes the audio input to generate a CNN output; determine a resulting dilation from the CNN output, the resulting dilation of the CNN output includes separating the sounds of the audio input; determine a word error rate for the dilated CNN output to determine an accuracy for speech to text outputs; set an adjustment parameter to change a range of the dilation based on the word error rate; and adjust the resulting dilation of the CNN output based on the adjustment parameter to reduce the word error rate.

One advantage of the present invention includes reducing word error rates when translating speech content from a separated audio input for converting speech from an audio input to text using speech recognition using a method according to the present invention.

In a related aspect, the system further including: identifying speech content from the speaker from the audio input based on the learning modifications applied to the adjusted resulting dilating for the speaker.

In a related aspect, the system further includes generating text from the identified speech content.

In a related aspect, the audio input and the predicted changes are received without dilation of the speech content.

In a related aspect, the system further includes adjusting the resulting dilating of the audio input based on the word error rate using a grid search to reduce the word error rate.

In a related aspect, the system further including: receiving, at a computer, a forecast audio input for a speaker, the forecast audio input including speech content for the speaker; generating an environmental stimulus audio input for the forecast audio input; and predicting changes of the audio input for the speaker based on environmental stimulus audio input.

In a related aspect, the system further includes: sharing the adjusted resulting dilating of the forecast audio input with a social network; generating learning modifications from the sharing of the adjusted resulting dilating of the forecast audio input; applying the learning modifications to the adjusted resulting dilating for the speaker; identifying speech content from the speaker from the audio input based on the learning modifications applied to the adjusted resulting dilating for the speaker; and generating text from the identified speech content.

In a related aspect, the system further includes: sharing the adjusted resulting dilating of the forecast audio input with a social network; generating learning modifications from the sharing of the adjusted resulting dilating of the forecast audio input; and applying the learning modifications to the adjusted resulting dilating for the speaker.

In a related aspect, the system includes identifying speech content from the speaker from the audio input based on the learning modifications applied to the adjusted resulting dilating for the speaker.

In a related aspect, the system further includes generating text from the identified speech content.

In another aspect according to the present invention, a computer program product for speech recognition using dilation of speech content from a separated audio input and includes a computer readable storage medium having program instructions embodied therewith. The program instructions are executable by a computer to cause the computer to perform functions, by the computer, comprising the functions to: receive an audio input, and receiving predicted changes for the audio input based on an external noise, at a CNN (Convolutional Neural Network), the audio input having speech content from a speaker; apply, in the CNN, diarization to the audio input to predict how a dilation of speech content from the speaker changes the audio input to generate a CNN output; determine a resulting dilation from the CNN output, the resulting dilation of the CNN output includes separating the sounds of the audio input; determine a word error rate for the dilated CNN output to determine an accuracy for speech to text outputs; set an adjustment parameter to change a range of the dilation based on the word error rate; and adjust the resulting dilation of the CNN output based on the adjustment parameter to reduce the word error rate.

One advantage of the present invention includes reducing word error rates when translating speech content from a separated audio input for converting speech from an audio input to text using speech recognition using a method according to the present invention.

In a related aspect, the computer program product further includes: identifying speech content from the speaker from the audio input based on the learning modifications applied to the adjusted resulting dilating for the speaker.

In a related aspect, the computer program product further includes generating text from the identified speech content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
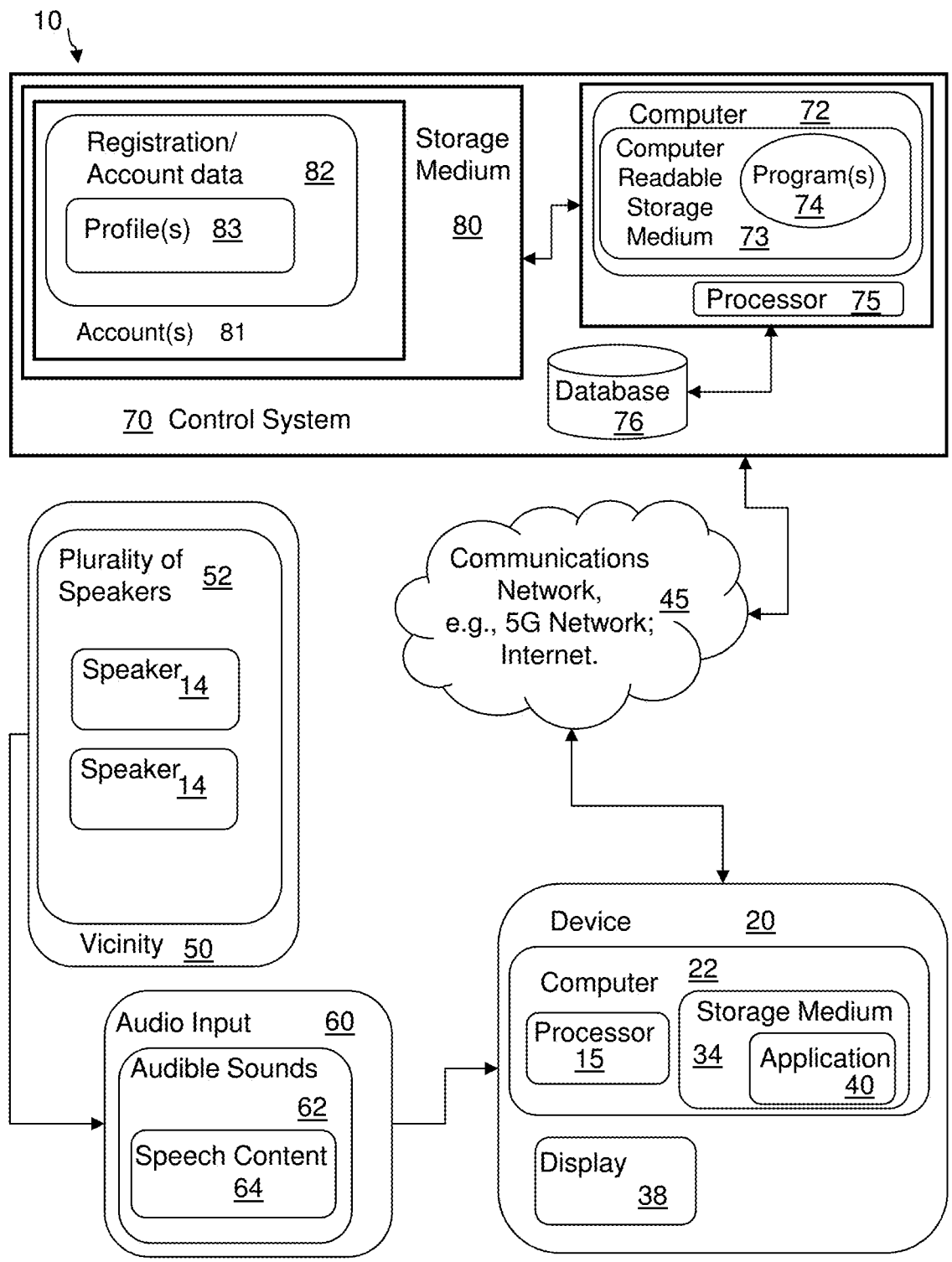
FIG. 1 is a schematic block diagram illustrating an overview of a system, system features or components, and methodology for speech recognition using dilation of speech content from an interlaced audio input, according to an embodiment of the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiment according to the present disclosure analyzes speech content from an interlaced audio input to provide speech recognition for each of a plurality of speakers, and thereby provide word recognition and identification and translation to text from the speech content. The present disclosure enables speech recognition and translation from speech to text when sounds are changed or less common than typical phonetics of words, for example, when speech content includes changed and/or atypical sounds from a speaker.

Embodiments of the present disclosure includes speech recognition using dilation of a speech signal or speech input, to increase the space between samples or speech samplings before attempting to recognize a word or analyzing speech content to recognize a word or words. In one example according to the present disclosure, a Convolutional Neural Network (CNN) with different dilation parameters can be trained and applied to these problems. In another example forecasted environmental noise and speech type can indicate which dilation to use. In another example, each speaker can be assigned a dilation parameter through machine learning. In another example, in a group setting of a conversation or song, the dilation of the parameters can be weighted together by the group based on the amplitude of each speaker.

Embodiments of the present disclosure can thereby provide forecasting environmental noise to set a dilation parameter. In another example, embodiments of the present disclosure classify speech type (e.g., singing, spoken) to contribute to the dilation parameter. In another example, embodiments of the present disclosure adapt the speech spread to other independent models. In another example, embodiments of the present disclosure can include averaging dilation parameters based on speaker diarization and group models. And, in another example, embodiments of the present disclosure can include social dilation transfer of knowledge.

Thereby, the embodiments of the present disclosure include modeling dilation from environmental noise and forecasting dilation parameters. A dilation spread can be mapped, and further, social aspects can be combined with dilation metrics of each person of a conversation.

Figure 2:
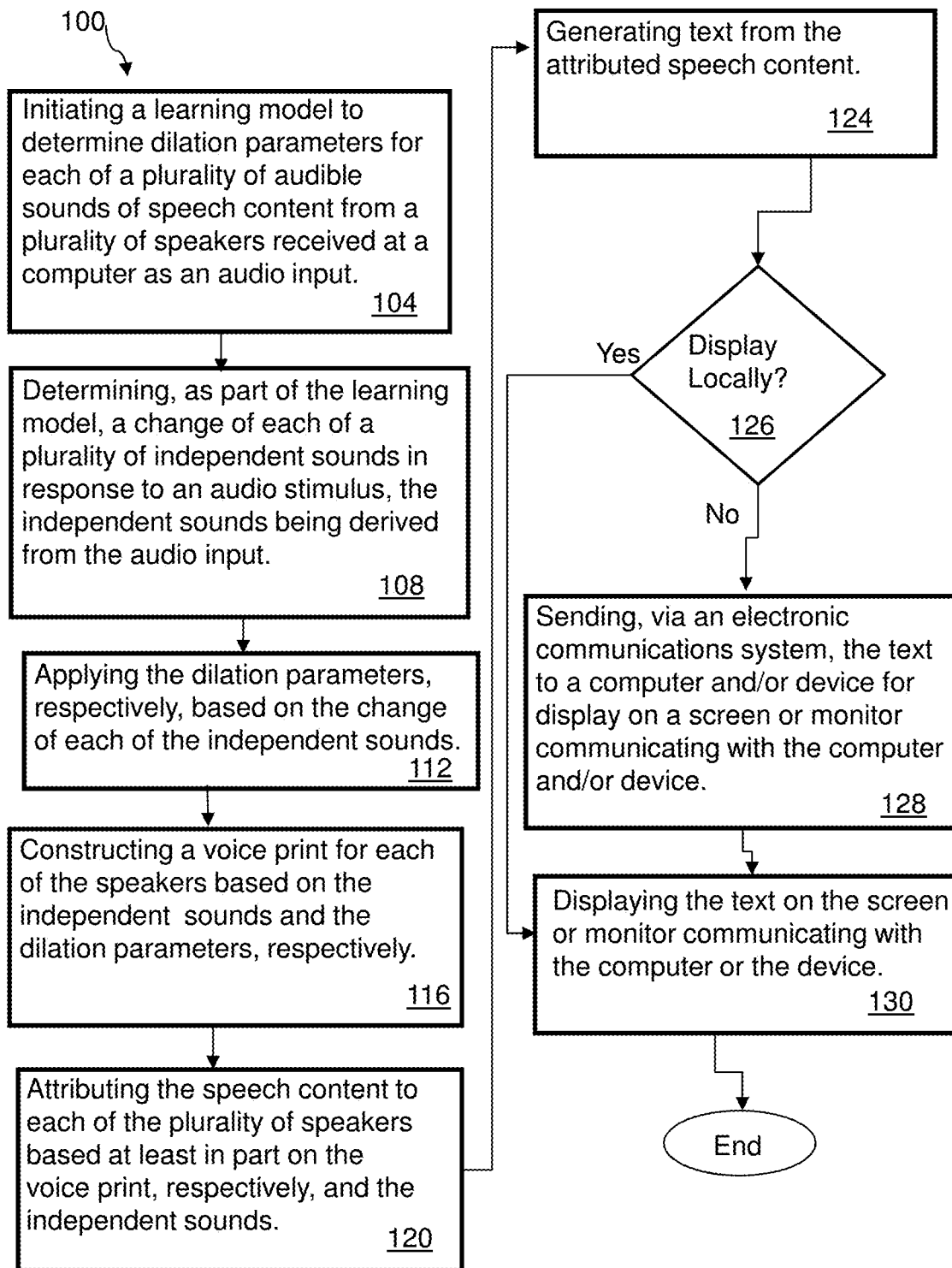
FIG. 2 is a flow chart illustrating a method, implemented using the system shown in FIG. 1, for speech recognition using dilation of speech content from an interlaced audio input, according to an embodiment of the present invention.

Referring to FIGS. 1 and 2, a method 100 (FIG. 2) with reference to a system 10 (FIG. 1) according to an embodiment of the present disclosure is provided for speech recognition using dilation of speech content from an interlaced audio input. Referring to FIG. 2, the method includes a series of operation blocks for implementing one embodiment according to the present disclosure. Referring to FIG. 2, the method 100 includes initiating a learning model 320 (see FIG. 6) to determine dilation parameters 324 for each of a plurality of audible sounds 62 of speech content 64 from a plurality of human speakers 52 received at a computer 22 as an audio input 60, as in block 104.

Figure 4:
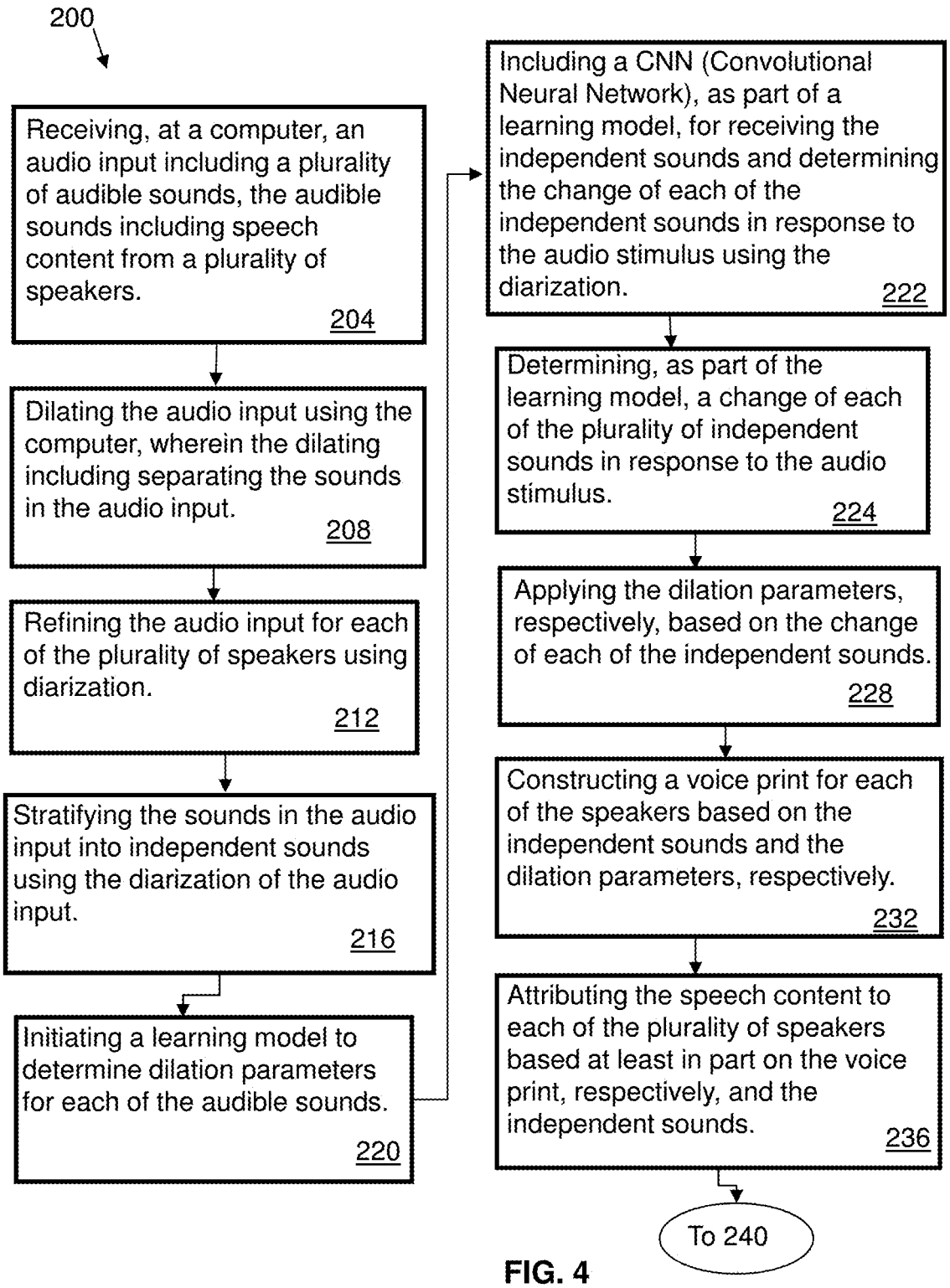
FIG. 4 is a flow chart illustrating another embodiment of a method according to the present disclosure, implemented using the system shown in FIG. 1, for speech recognition using dilation of speech content from an interlaced audio input.
Figure 5:
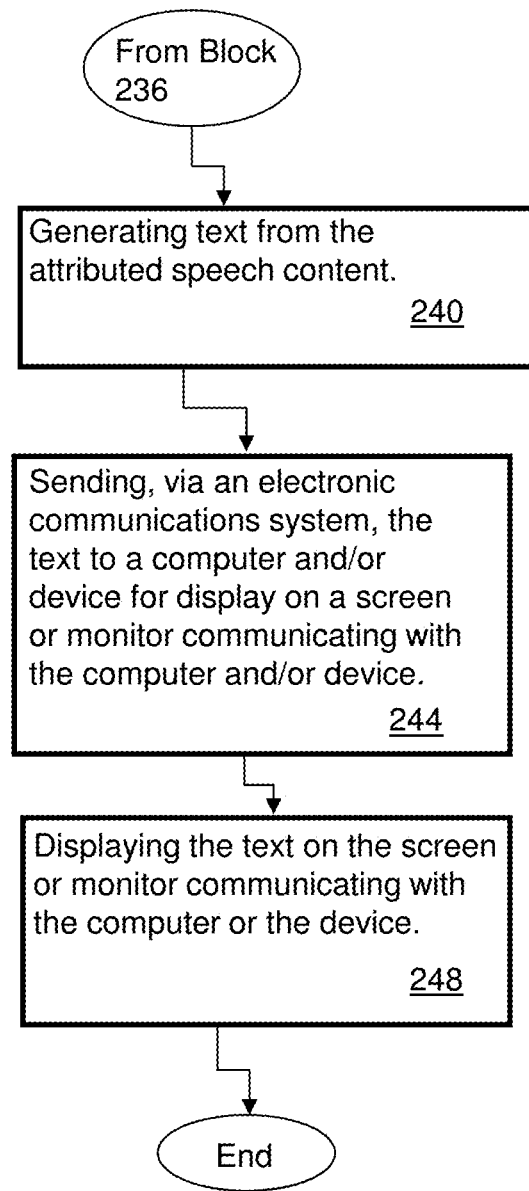
FIG. 5 is a flow chart continuing from the flow chart shown in FIG. 4 depicting a continuation of the method shown in FIG. 4, according to an embodiment of the invention.
Figure 6:
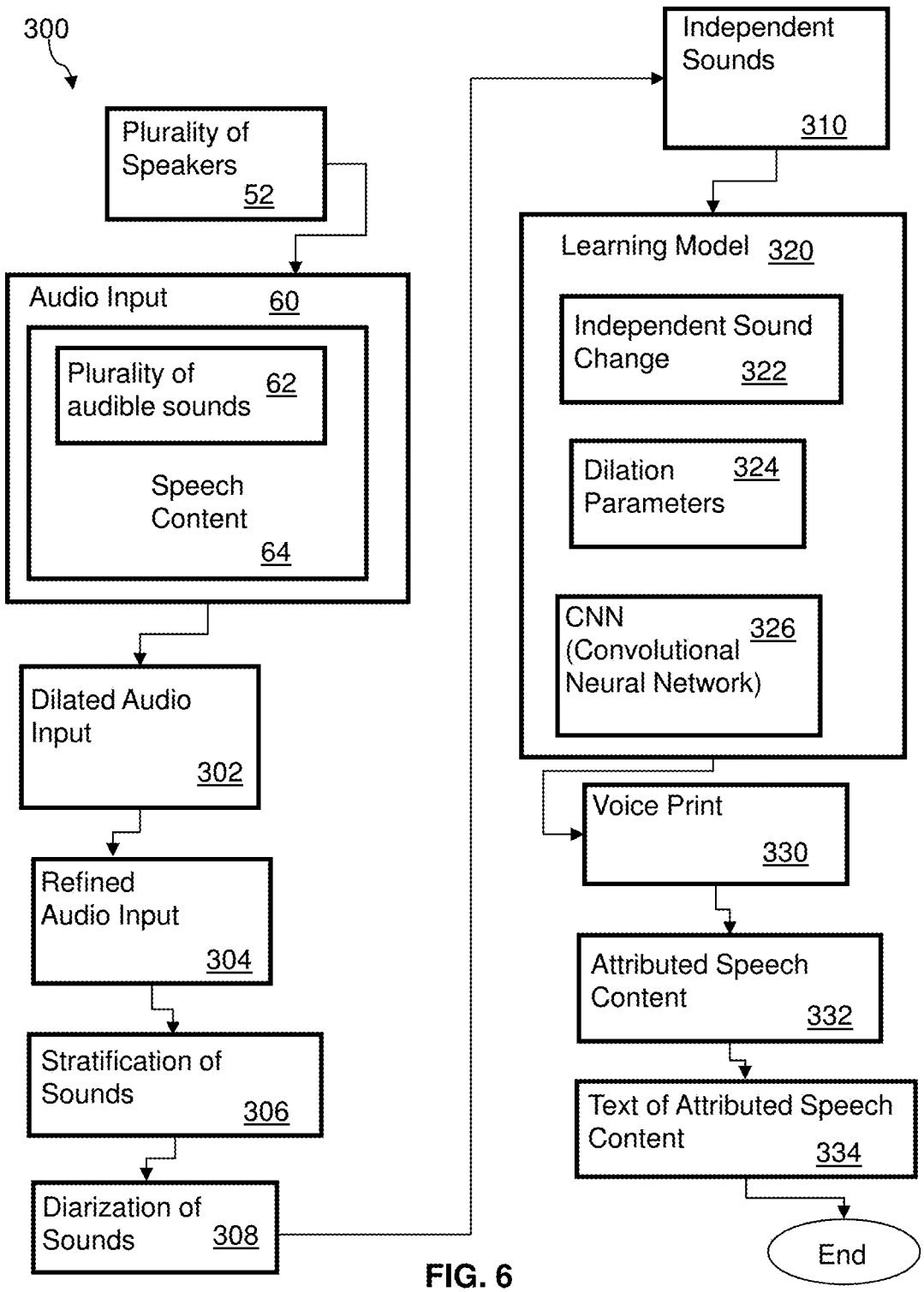
FIG. 6 is a functional schematic block diagram, showing a series of operations and functional methodologies, for instructional purposes illustrating functional features of the present disclosure associated with the embodiments shown in FIGS. 1, 2, 3, 4 and 5, for speech recognition using dilation of speech content from an interlaced audio input.

With reference to FIG. 6, a functional system 300 includes components and operations for embodiments according to the present disclosure, and is used herein for reference with the methods and systems shown in FIGS. 1, 2, 3, 4 and 5.

In one example a group of speakers can be speaking together. An audio output from the group of speakers can be received as an audio input using a computer or device, for example, using a microphone of the device or communicating with the device or computer.

In one example, a spectrogram can be generated and used as a visual representation of the spectrum of frequencies of a signal, as in an audio signal, as it varies with time. A spectrogram can also be referred to as a sonograph, voiceprint, or voicegram.

A spectrogram can be created and a DFT (Discrete Fourier Transform) can be applied to determine potential unique speakers. A DFT can convert a finite sequence of equally-spaced samples of a function into a same-length sequence of equally-spaced samples of the Discrete-Time Fourier Transform (DTFT), which is a complex-valued function of frequency. An initial dilation variable can be initialized to each DFT's estimation.

In one example, when it is known who is speaking or singing in a group, the dilation parameters can be adjusted or specified based on that information. Such identification information can be gleaned, for example, from input, observation, of social media.

A plurality of audible sounds can include, for example, one or more human speakers 14 or users, as a plurality of human speakers 52 or users, in a vicinity 50, speaking and producing audible sounds 62. The audible sounds can include, for example, a human speaking in a conversation, a solo speech, singing, a group of speakers singing, etc. And, the audible sounds 62 thus producing and including speech content 64.

The audible sounds can be received at a computer, as an audio input 60, via a microphone in the computer 22 or a device 20, such as a mobile device, and the computer can send an audio file to another computer 72 or server, e.g., a remote computer or server, alone or in combination with a control device of control system 70 (via a communications network 45, e.g., the Internet, for processing according to the techniques of the present disclosure. In another example, the audible sounds in an audio file can be processed according to the techniques of the present disclosure locally on the computer, and/or in combination with a remote computer or server.

The learning model 320 can include machine learning using parameters. For example, dilation parameters can be assigned to each of a plurality of speakers or users using machine learning.

Dilation of sounds for speech recognition can be defined as increasing the space between sounds or sound samples. In the present disclosure, dilation is performed before attempting to recognize a word from the sounds.

Dilation parameters can include a specified amount of space between sound samples, or specifying a range of space between sound samples. A dilation variable can be assigned to each potential speaker and used in the learning model.

Figure 3:
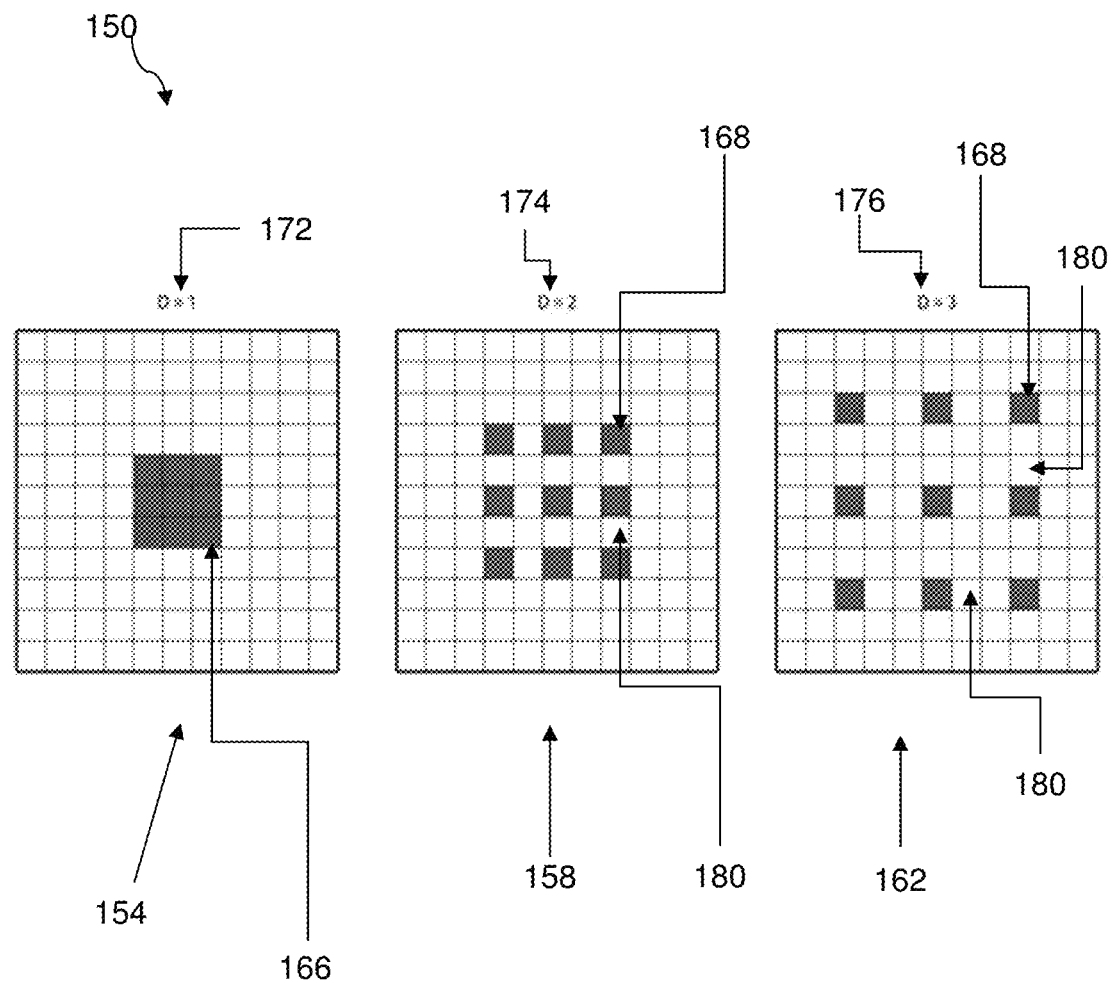
FIG. 3 is a series of tables showing an embodiment of dilation according to the present disclosure.

In one example, referring to FIG. 3, representative images 150 of tables 154, 158, 162, depicting dilation of an image 166, which can for example be a sound image, stratified into pieces or sound samples 168. The images 150 depict the changing of a dilation parameter D. In a table 154 the dilation parameter 172 equals 1 and the image 166 has no spacing. In a second table 158, the dilation parameter 174 equals 2 and the image has sound samples 168 with spaces 180 between samples. In a third table 162, the dilation parameter 176 equals 3 and the image has sound samples 168 with more spaces 180 between samples.

The method includes determining, as part of the learning model, a change of each of a plurality of independent sounds in response to an audio stimulus, the independent sounds being derived from the audio input, as in block 108. For example, an audio stimulus can include an environmental stimulus. A change in the sounds, or an independent sound change 322, can be determined in response to the environmental stimulus.

In one embodiment, the audio input can be refined for each of the plurality of speakers using diarization. For example, diarization can include or include a process of partitioning an input audio stream into segments corresponding to a speaker identity, and in one example the segments can be homogeneous. The diarized signals can be used to stratify the audio input into the independent sounds.

Diarization can be used for deep learning to refine an audio input from each of a plurality of speakers which are attributable to each speaker. In one example, if there is an error from the DFT and/or deep learning approach of speaker identification, diarization parameters can be averaged together.

In one example, a voice print can be constructed. In one example, an environmental stimulus can be played, and a determination can be made as to how stratified data changes. Dilation parameters can be modified based on the audio input data (e.g., speech data) changes. For example, if the speech is more elongated, the dilation parameter can increase. In addition, dilation parameters relative to each speaker can be based on a correlation factor of the independent signals. A coefficient of correlation (R Value) is a value which is given in a summary table in a regression output. An R square is called a coefficient of determination, that is, R times R to get the R square value. A coefficient of determination is a square of a coefficient of correlation.

In one example, an R squared correlation metric determines how to combine the pairwise most correlated speakers together. For example, the rank of R can be shifted between 0 and 0.5 so that at most, the paired speaker will contribute 50% of the adjusted dilation.

The method includes applying the dilation parameters, respectively, based on the change of each of the independent sounds, as in block 112.

The method includes constructing a voice print for each of the speakers based on the independent sounds and the dilation parameters, respectively, as in block 116.

The method includes attributing the speech content to each of the plurality of speakers based at least in part on the voice print, respectively, and the independent sounds, as in block 120.

The method can include generating text from the attributed speech content, as in block 124.

If the generated text is to be displayed locally, as decided in block 126, for example, on a local computer, the method continues to block 130. If the generated text is not to be displayed locally, as decided in block 126, to be displayed on a device or computer display or monitor, the method continues to block 128.

The method includes displaying the text on the screen or monitor communicating with the computer or the device, as in block 130, in response to displaying the text location as decided in block 126.

The method can include sending, via an electronic communications system, the text to a computer and/or device for display on a screen or monitor communicating with the computer and/or device, as in block 128, in response to not displaying the text locally as decided in block 126. The method can continue to display the text on the screen or monitor communicating with the computer or the device as in block 130.

The method can include the learning model 320 including a CNN 326 (Convolutional Neural Network) for receiving the independent sounds and determining the change of each of the independent sounds in response to the audio stimulus using the diarization.

A CNN (Convolutional Neural Network), can be at least part of deep learning, and a CNN is a class of deep neural networks. A CNN includes a mathematical operation generally defined as two functions that produce a third function and is called convolution. Convolution is a specialized kind of linear operation. Thus, convolutional networks are neural networks that use convolution in place of general matrix multiplication in at least one of multiple layers.

The method can include the audio input which can include the plurality of audible sounds, and the audio input can be received at the computer. Further, the audible sounds can include speech content from the plurality of speakers.

The method can further include dilating the audio input using the computer. The dilating can include separating the sounds in the audio input.

The method can further include refining the dilated audio input 302 for each of the plurality of speakers using diarization of sounds 308.

The method can further include stratifying the sounds 306 in the refined audio input 304 into independent sounds 310 using the diarization of the audio input.

The method can include the separating of the sounds in the audio input includes distinguishing environmental or background sounds from speech from a speaker of the plurality of speakers.

The method can include the refining of the audio input for each of the plurality of speakers using the diarization which can include partitioning the audio input into homogeneous segments relating to a speaker identity.

In another embodiment according to the present disclosure, referring to FIG. 4, a computer-implemented method 200 for speech recognition using dilation of speech content from an interlaced audio input includes receiving, at a computer, an audio input including a plurality of audible sounds, the audible sounds including speech content from a plurality of speakers, as in block 204. Operational blocks of the method 200 shown in FIGS. 4 and 5 may be similar to operational block shown in FIG. 2. The method shown in FIGS. 4 and 5 is intended as another example embodiment which can include aspects/operations shown and discussed previously in the present disclosure.

The method 200 includes dilating the audio input using the computer, wherein the dilating including separating the sounds in the audio input, as in block 208.

The method 200 includes refining the audio input for each of the plurality of speakers using diarization, as in block 212. The method can include stratifying the sounds in the audio input into independent sounds using the diarization of the audio input, as in block 216.

The method 200 includes initiating a learning model to determine dilation parameters for each of the audible sounds, as in block 220.

The method 200 can include the learning model including a CNN (Convolutional Neural Network) for receiving the independent sounds and determining the change of each of the independent sounds in response to the audio stimulus using the diarization, as in block 222.

The method 200 includes determining, as part of the learning model, a change of each of the plurality of independent sounds in response to the audio stimulus, as in block 224.

The method 200 includes applying the dilation parameters, respectively, based on the change of each of the independent sounds, as in block 228.

The method 200 includes constructing a voice print 330 for each of the speakers 52 based on the independent sounds 310 and the dilation parameters 324, respectively, as in block 232.

The method 200 includes attributing the speech content to each of the plurality of speakers based at least in part on the voice print, respectively, and the independent sounds, as in block 236. The attributed speech content 332 can be used to generate text.

Referring to FIG. 5, the method 200 includes generating text 334 from the attributed speech content 332, as in block 240.

The method 200 further includes sending, via an electronic communications system, the text to a computer and/or device for display on a screen or monitor communicating with the computer and/or device, as in block 244. In another example, communications can be implemented from a group consisting of: SMS, Email, Instant messages, navigation software. Such examples are intended to be exemplary and non-exhaustive.

The method 200 can further include displaying the text on the screen or monitor communicating with the computer or the device, as in block 248.

ADDITIONAL EXAMPLES

Figure 7:
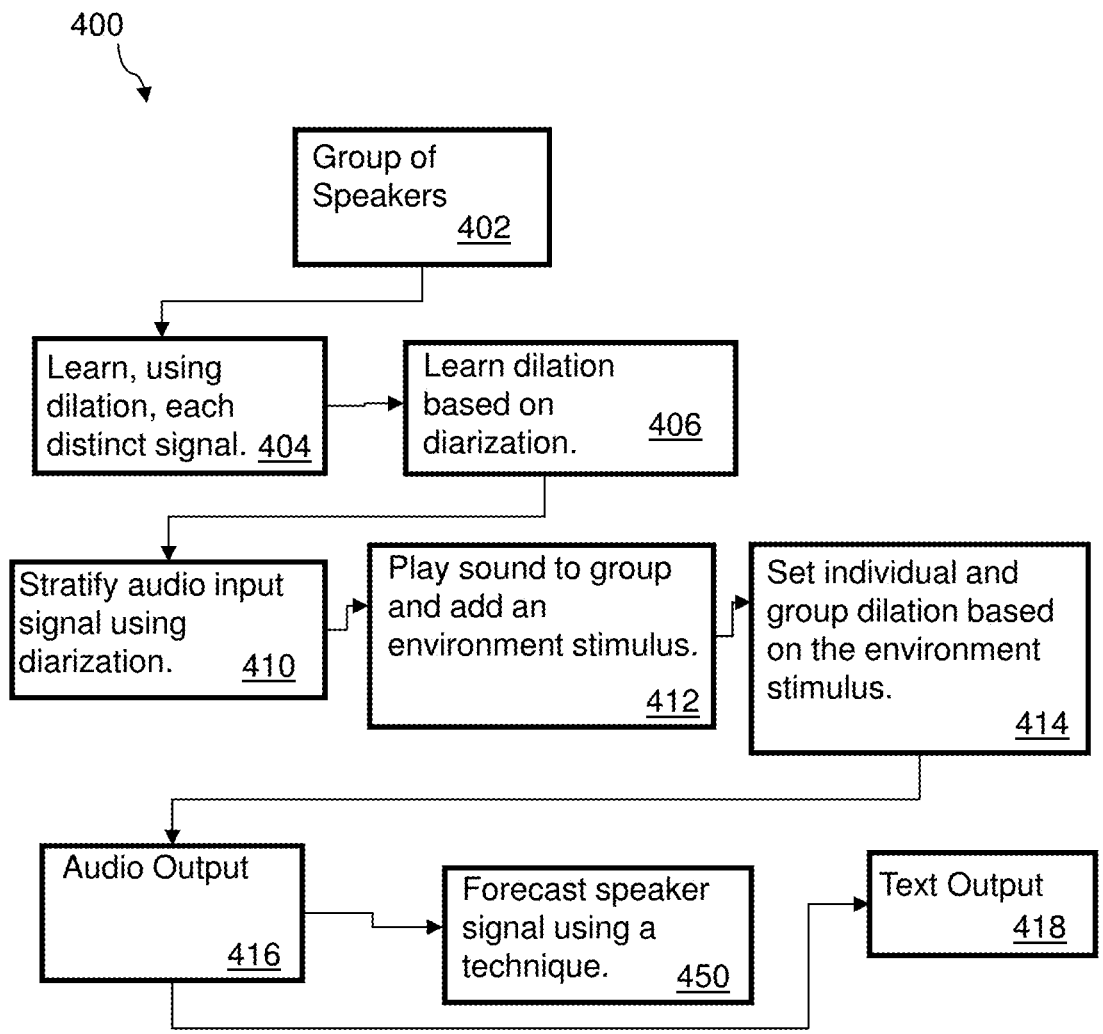
FIG. 7 is a functional schematic block diagram, showing a series of operations and functional methodologies, for instructional purposes illustrating functional features of the present disclosure associated with the embodiments shown in FIGS. 1, 2, 3, 4 and 5, for speech recognition using dilation of speech content from an interlaced audio input.

Referring to FIG. 7, a functional system 400, according to an embodiment of the present disclosure and indicative and supporting the embodiments discussed herein, includes components and operations for speech recognition using dilation of speech content from an interlaced audio input. The system 400 includes a group of human speakers 402 outputting an audio output. The audio output is received to learn, using dilation, each distinct signal, as in block 404. The system can learn dilation of the audio input signal based on diarization, as in block 406.

The system includes stratifying the audio input signal using diarization, as in block 410. The system includes playing a sound, e.g., an environmental stimulus, to group the diarized audio input signal, as in block 412. The system including setting individual and group dilation based on the environment stimulus, as in block 414. The system includes generating an audio output as in block 416. The system includes generating a text output, as in block 418, using the audio output 416 based on the dilation and the environment stimulus.

In one example, the system can forecast a speaker signal using a forecast speaker signal technique or method/system, as in block 450, to predict a speaker's signal in the future, in one example by predicting how the speakers signal will change based on external noise. Such forecasting is not the focus of the present disclosure.

Figure 8:
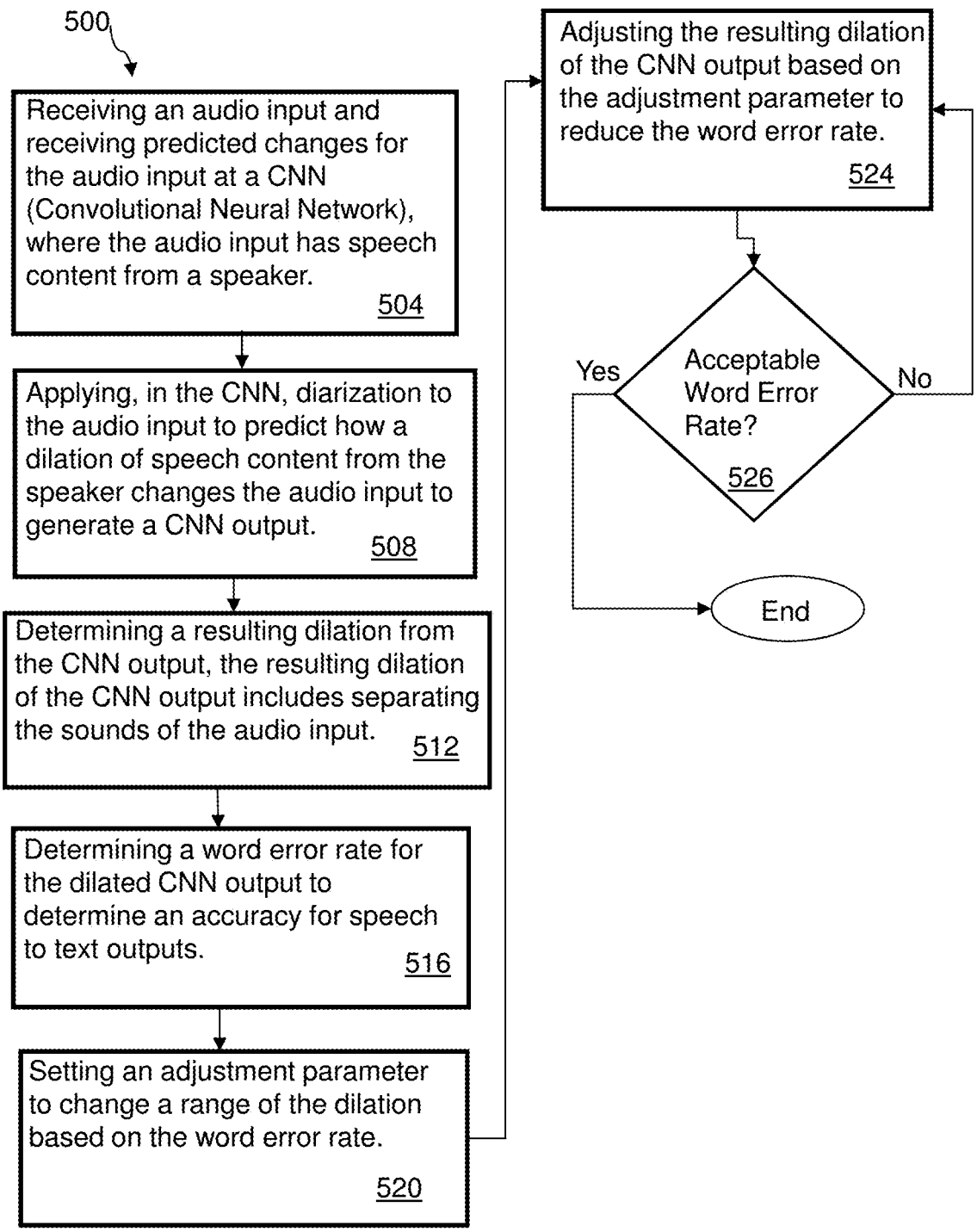
FIG. 8 is a flow chart illustrating a method, according to an embodiment of the present disclosure, implemented using the system shown in FIG. 1, for speech recognition using dilation of speech content from a separated audio input, according to an embodiment of the present invention.

In the embodiment of the present disclosure shown in FIGS. 1 and 2, a computer can be part of a remote computer or a remote server, for example, remote server 1100 (FIG. 8). In another example, the computer 72 can be part of a control system 70 and provide execution of the functions of the present disclosure. In another embodiment, a computer 22 can be part of a mobile device 20 and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the mobile device 20 can include a computer 22 having a processor 15 and a storage medium 34 which stores an application 40. The application can incorporate program instructions for executing the features of the present disclosure using the processor 15. In another example, the mobile device 20 application 40 can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device 20 can communicate using a communications network 45, for example, the Internet.

Thereby, the method 100 according to an embodiment of the present disclosure, can be incorporated in one or more computer programs or an application 40 stored on an electronic storage medium 34, and executable by the processor 15, as part of the computer on the mobile device 20. For example, a human speaker or user 14 has a device 20, and the device can communicate with the control system 70. Other users (not shown) may have similar devices and communicate with the control system similarly. The application can be stored, all or in part, on a computer or a computer in a mobile device and at a control system communicating with the device, for example, using the communications network 45, such as the Internet. It is envisioned that the application can access all or part of program instructions to implement the method of the present disclosure. The program or application can communicate with a remote computer system via a communications network 45 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 8 and described in more detail in regards thereto referring to one or more computer systems 1010.

Thus, in one example, a control system 70 is in communication with the device(s) 20, and the device 20 can include the application 40. The device 20 communicates with the control system 70 using the communications network 45.

In another example, the control system 70 can have a front-end computer belonging to one or more users, such as the device 20, and a back-end computer embodied as the control system.

Also, referring to FIG. 1, the device 20 can include a computer 22, computer readable storage medium 34, and operating systems, and/or programs, and/or a software application 40, which can include program instructions executable using a processor 15. These features are shown herein in FIG. 1, and also in an embodiment of a computer system shown in FIG. 8 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer for implementing the features of the method according to the present disclosure. In another example, a computer for implementing the features of the method can be part of a mobile device and thus implement the method locally.

OTHER EXAMPLES

It is understood that the features shown in FIGS. 6 and 7 are functional representations of features of the present disclosure. Such features are shown in embodiments of the systems and methods of the present disclosure for illustrative purposes to clarify the functionality of features of the present disclosure.

Specifically, regarding the control system 70, the device(s) 20 of one or more users 14 can be in communication with the control system 70 via the communications network 50. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, which also has access to the database 76.

The control system 70 can include a storage medium 80 for maintaining a registration 82 of users and their devices for analysis of the audio input. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 20 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

In one example, Artificial Intelligence (AI) can be used, all or in part, for a learning model for determining dilation parameters.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

ANOTHER EMBODIMENT(S) AND EXAMPLES

Referring to FIGS. 1 and 8, a method 500 (FIG. 8) with reference to a system 10 (FIG. 1) according to an embodiment of the present disclosure is provided for speech recognition using dilation of speech content from a separated audio output (or also referred to as a singular). Referring to FIG. 8, the method includes a series of operation blocks for implementing one embodiment according to the present disclosure. Referring to FIG. 8, the method 100 includes receiving an audio input and receiving predicted changes for the audio input at a CNN (Convolutional Neural Network), where the audio input has speech content from a person, i.e., a human speaker, as in block 504.

In one example, the audio input can include speech content from a human speaker, for example, an audio input using a computer or device, for example, using a microphone of a device or a microphone communicating with a device or computer. In one example, the speaker audio input can be represented as block 802 in the system 800 shown in FIG. 12. In another example, the speaker audio input can be represented as block 52, as shown in FIGS. 1 and 11, and used, at least in part, as an audio input 704.

In another example, the audio input can include an output from a system or method for recognizing speech. For example, a system and method can use dilation and dialization for recognizing speech, such as, the method 100 shown in FIG. 2. Additionally, in this example, the output of the method 100 at block 120 can be used as an audio input for a speaker in the method 500. Such audio output from a system can also be represented as block 416 in the system 800 shown in FIG. 12, and can be used as an audio input, at least in part, for a speaker signal 804. In another example, an audio output of a speaker from a system using dilation is represented by block 702 of system 700 shown in FIG. 11, and can be used as, at least part of, an audio input 704.

Figure 11:
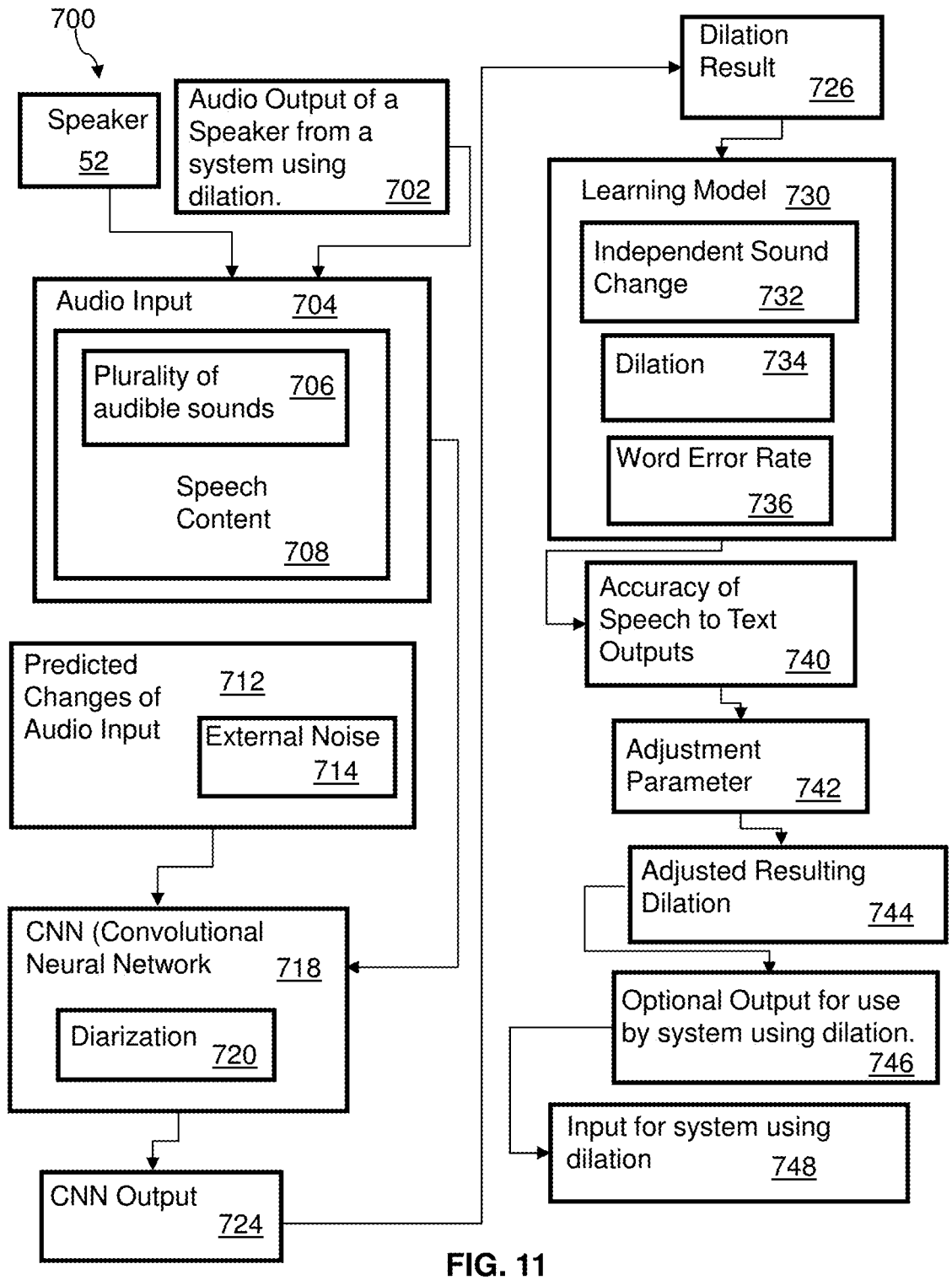
FIG. 11 is a functional schematic block diagram, showing a series of operations and functional methodologies, for instructional purposes illustrating functional features of the present disclosure associated with the embodiments shown in FIGS. 8, 9, and 10 for speech recognition using dilation of speech content from a separated audio input.

In each case, an audio input includes speech content from a human speaker, wherein the speech content 708 (FIG. 11) has a plurality of audible sounds 706 (FIG. 11).

Referring to FIGS. 8 and 11, in one example, the received predicted changes 712 for the audio input based on an external noise 714 can include a set of predicted changes, for example, derived from a learning model. The learning model can, for example, use one or more external noises and model changes in an audio input based on the external noises. The external noises, for example, can include, but are not limited to, background noises, including, for example, environmental sounds, and additional speaking noises.

A CNN (Convolutional Neural Network) 718, can be at least part of deep learning, and a CNN is a class of deep neural networks. A CNN includes a mathematical operation generally defined as two functions that produce a third function and is called convolution. Convolution is a specialized kind of linear operation. Thus, convolutional networks are neural networks that use convolution in place of general matrix multiplication in at least one of multiple layers.

Referring to FIG. 8, the method 500 includes applying, in the CNN, diarization 720 to the audio input to predict how a dilation of speech content from the speaker changes the audio input to generate a CNN output 724, as in block 508. For example, a learning model can include dilation of the speech content and an analysis to predict how the dilation changes the speech content.

The method 500 includes determining a resulting dilation 726 from the CNN output, the resulting dilation of the CNN output includes separating the sounds 732 of the audio input, as in block 512. For example, a learning model 730 can determine a dilation 734 and prediction of how the dilation will change the speech content.

The method 500 includes determining a word error rate 736 for the dilated CNN output to determine an accuracy for speech to text outputs, as in block 516. For example, the method can determine an accuracy 740 percentage for conversion of speech to text. In another example, the method can determine accuracy numbers for conversion of speech to text, for example, different percentages of accuracy for different dilations and predictive models.

The method 500 includes setting an adjustment parameter to change a range of the dilation based on the word error rate 736, as in block 520. For example, one or more adjustment parameters can be used to set a dilation or a range of dilation for the speech content. The adjustment parameters 742 can be based on the word error rate 736, for example, adjusting the dilation 744 in concert with the word error rate.

The method 500 includes adjusting the resulting dilation of the CNN output based on the adjustment parameter to reduce the word error rate, as in block 524. In one example, the dilation can be increased when the word error rate is higher. In another example, a threshold word error rate can be used to trigger changing, e.g., increasing, dilation when the threshold word error rate is met, for instance, a word error rate which is unsatisfactorily high. In another instance, the threshold word error rate may not be met indicating that the word error rate is acceptable.

Referring to FIG. 8, the method 500 may have an acceptable word error rate at bock 526, and the method ends. When the method does not have an acceptable word error rate, the method can return to block 524 to adjust the dilation of the CNN.

Figure 12:
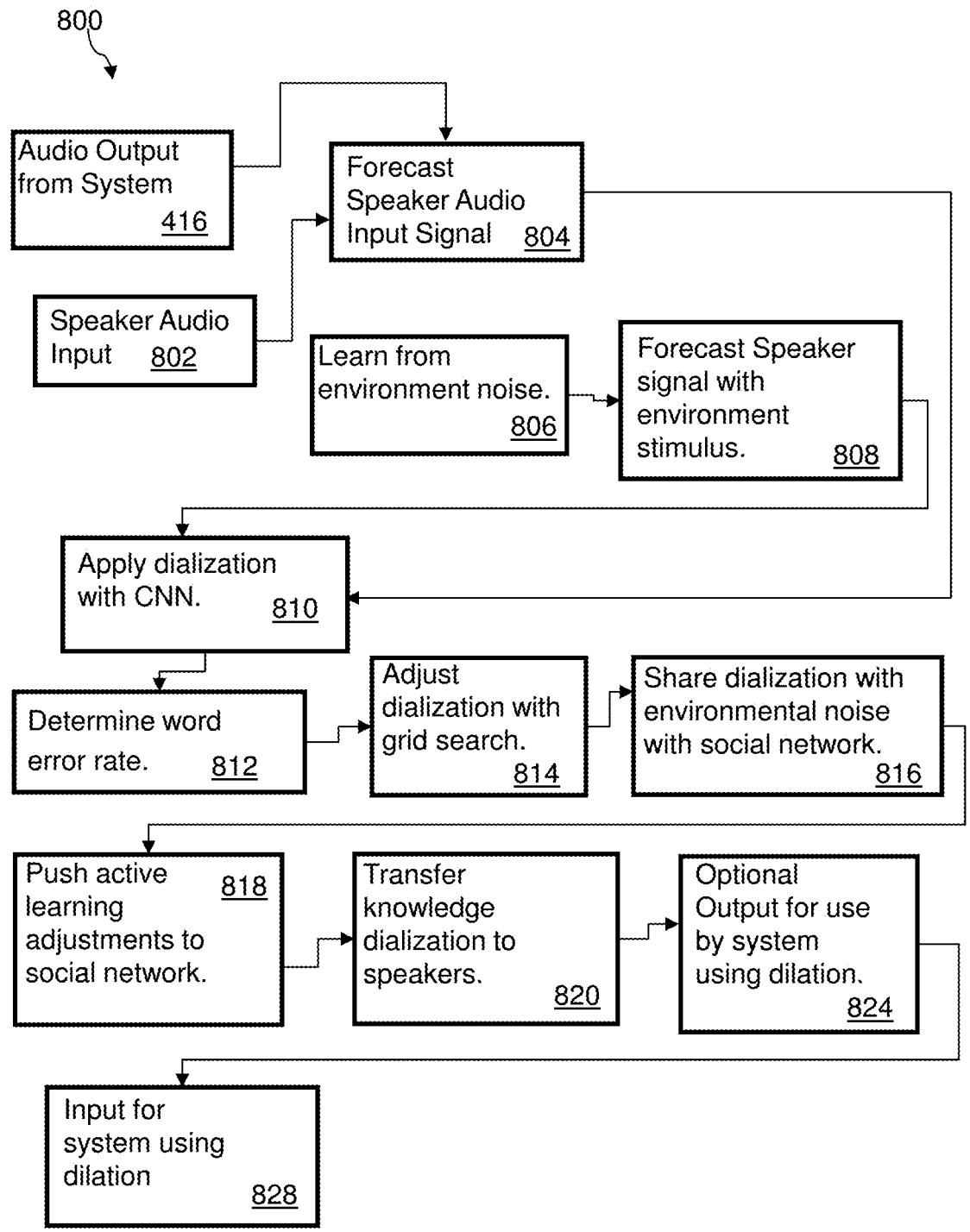
FIG. 12 is a functional schematic block diagram, showing a series of operations and functional methodologies, for instructional purposes illustrating functional features of the present disclosure associated with the embodiments shown in FIGS. 8, 9, and 10 for speech recognition using dilation of speech content from a separated audio input.

In one embodiment, the adjusted resulting dilation 524 can be an output for use by a system using dilation for speech recognition, as referring to in block 746 of FIG. 11, and in block 824 of FIG. 12. The output can be used as an input for the system using dilation for speech recognition, as in block 748 of FIG. 11 and as in block 828 of FIG. 12. In another example, the output at blocks 746 and 824, and also referred to in the method 500 at block 524 and in the method 600 at block 648, can be use, at least in part, as an input in previously discussed embodiments, for example, at block 104 in FIG. 2, at block 204 in FIG. 4, at block 60 in FIG. 6, and at block 404 in FIG. 7.

The method can further include identifying speech content from the speaker from the audio input based on the learning modifications applied to the adjusted resulting dilating for the speaker.

In another example, the method can include generating text from the identified speech content.

In another example, the audio input and the predicted changes in the method, are received without dilation of the speech content.

In another example, the method further includes adjusting the resulting dilating of the audio input based on the word error rate using a grid search to reduce the word error rate. For instance, a grid search can be used to find optimal hyperparameters of a model, e.g., learning algorithm or a computer learning model, which can result in more accurate predictions.

The method can further include receiving, at a computer, a forecast audio input for a speaker, wherein the forecast audio input can include speech content for the speaker. An environmental stimulus audio input is generated for the forecast audio input. And, the method includes predicting changes of the audio input for the speaker based on environmental stimulus audio input.

In one example, the method can further include sharing the adjusted resulting dilating of the forecast audio input with a social network. Learning modifications can be generated from the sharing of the adjusted resulting dilating of the forecast audio input. The learning modifications can be applied to the adjusted resulting dilating for the speaker. The method includes identifying speech content from the speaker from the audio input based on the learning modifications applied to the adjusted resulting dilating for the speaker. And, the method includes generating text from the identified speech content.

The method can further include sharing the adjusted resulting dilating of the forecast audio input with a social network. The method can include generating learning modifications from the sharing of the adjusted resulting dilating of the forecast audio input, and applying the learning modifications to the adjusted resulting dilating for the speaker.

Additionally, the method can include identifying speech content from the speaker from the audio input based on the learning modifications applied to the adjusted resulting dilating for the speaker.

The method can include generating text from the identified speech content.

The method can include receiving dilation parameters for speech content of one of a plurality of speakers at the CNN, the dilation parameters derived from an audio input from a plurality of speakers.

In one example, the audio input from the plurality of speakers in the method is an interlaced audio input.

ADDITIONAL EXAMPLES AND EMBODIMENTS

Referring to FIG. 11, a functional system 700, according to an embodiment of the present disclosure and indicative and supporting the embodiments discussed herein, includes components and operations for speech recognition using dilation of speech content from an interlaced audio input. For example, the system 700 is representative of the functions included in the embodiments of the present disclosure, and includes operations used therein.

Referring to FIG. 12, a system 800, according to an embodiment of the present disclosure and indicative and supporting the embodiments discussed herein, includes components and operations for speech recognition using dilation of speech content from a separated audio input. The system 800 includes a speaker 802 outputting an audio output. The audio output is received to forecast a speaker signal, as in block 804. Alternatively, the system 800 can receive an audio output to provide a forecast speaker signal using a technique, for example, an audio output 416 of system 400 shown in FIG. 7. The system 800 receives an audio input for forecasting a speaker signal, as in block 804.

In one example, an audio input is received from a speaker. In another example, an audio input can be the output of a speech recognition system using dilation of speech content from an interlaced audio input, for example, the dilated speech content at block 332 of FIG. 6, or in another example, the audio output 416 shown in FIG. 7. In another example, the dilated audio input can be the dilated speech content at block 120 of FIG. 2, or in another example the attributed speech content at block 236 of FIG. 4, or the audio output 416 shown in FIG. 7.

The system 800 includes learning from environment noise, as in block 806 and forecasting a speaker signal with an environmental stimulus as in block 808.

Both the forecast speaker signal with environmental stimulus 808 and the forecast speaker signal 804 are received to apply dialization with a CNN, as in block 810.

A word error rate 812 is determined and dialization can be adjusted with a grid search, as in block 814. The dialization with environmental noise is shared with a social network as in block 816. Active learning adjustments are pushed to the social network, as in block 818. Knowledge of the dialization is transferred to the speakers as in block 820.

In an example Referring to FIG. 12, the output 824 for better dialization of speech content can be used as an input 828 into a system for speech recognition using dilation of an interlaced audio input. For example, the output can be received at block 414 of FIG. 7 as an input at block 414 for the system 400, to better set the dilation.

In another example, the output 824 can be received at block 320 of FIG. 6 as an input for the system 300 at block 326 for use by the CNN, to be used with dilation to result in a better resulting voice print.

Figure 9:
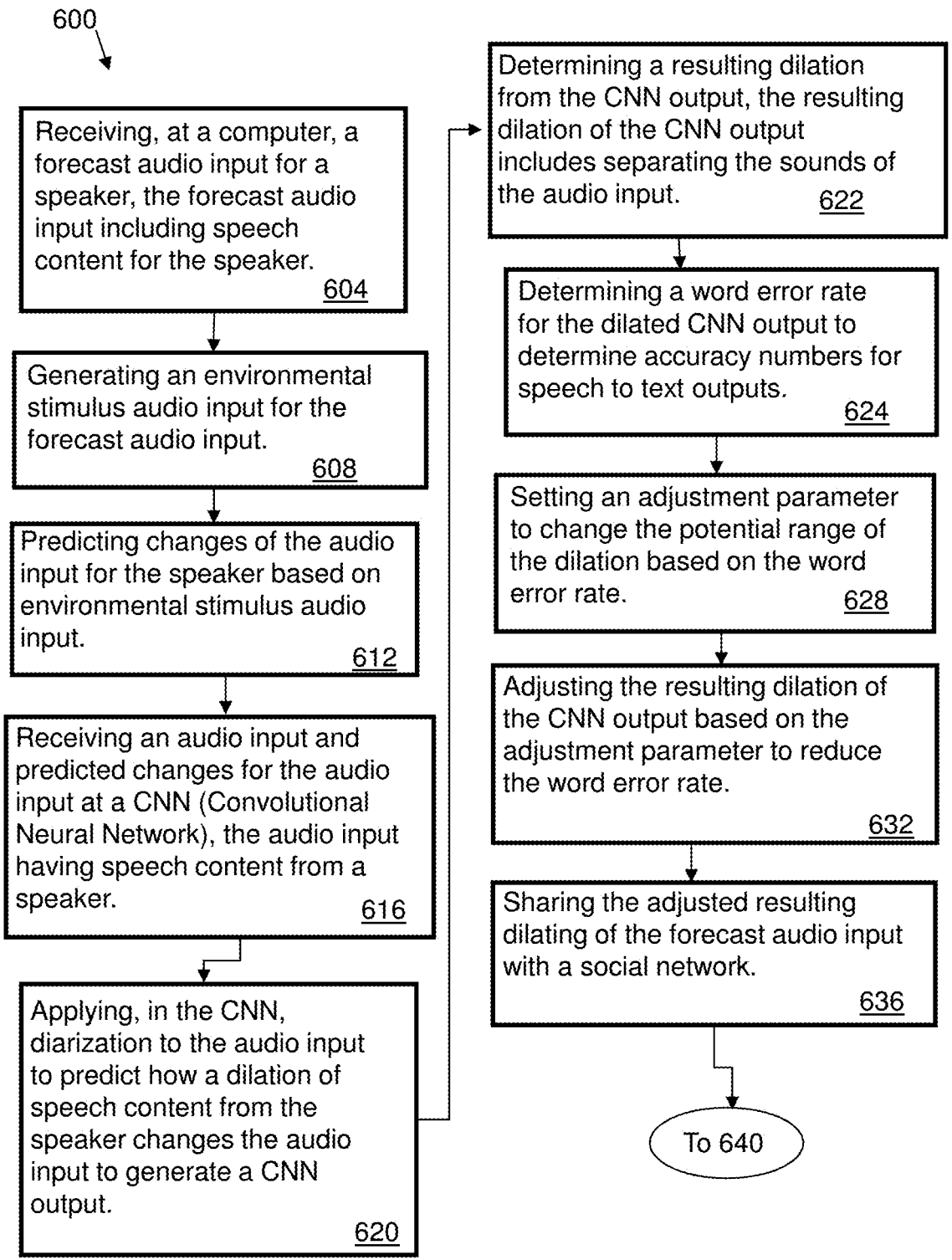
FIG. 9 is a flow chart illustrating another embodiment of a method according to the present disclosure, implemented using the system shown in FIG. 1, for speech recognition using dilation of speech content from a separated audio input.
Figure 10:
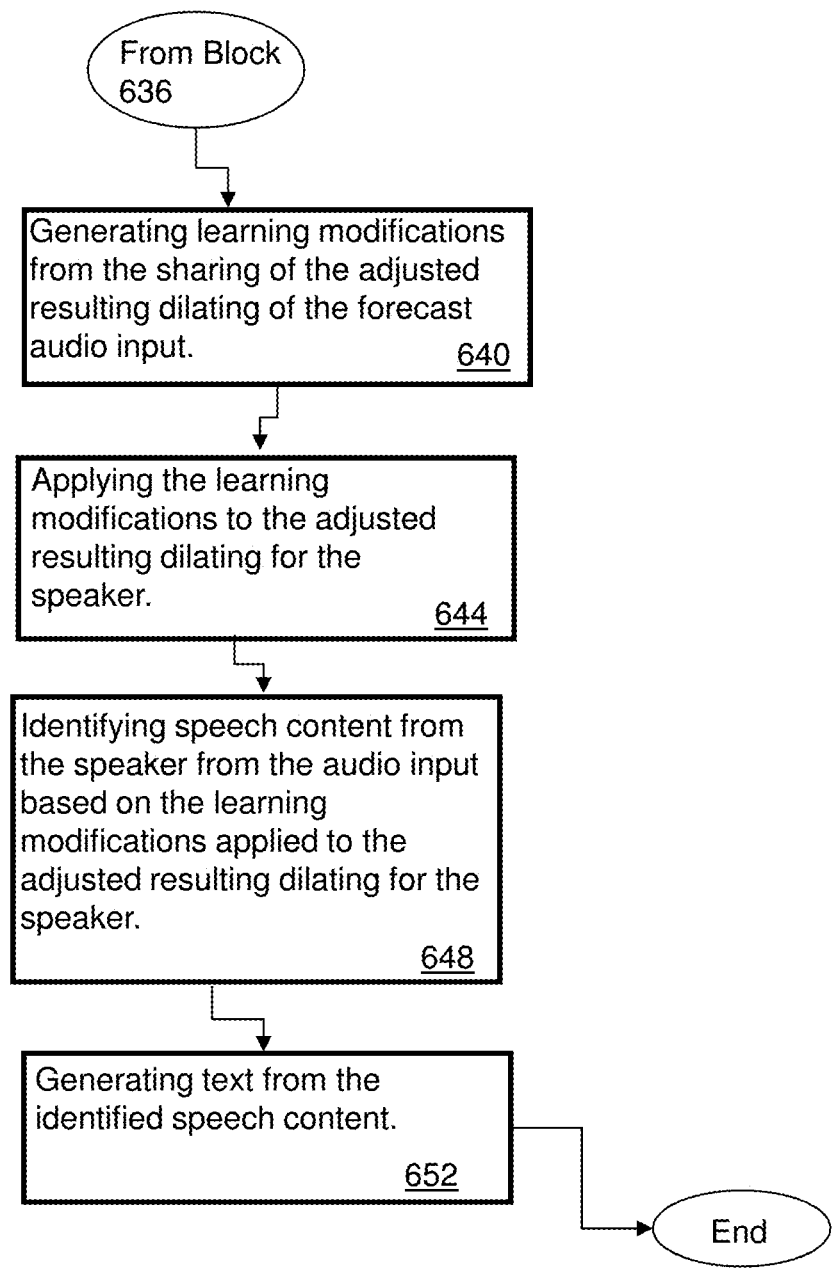
FIG. 10 is a flow chart continuing from the flow chart shown in FIG. 9 depicting a continuation of the method shown in FIG. 9, according to an embodiment of the disclosure.

Referring to FIG. 9, a method 600, according to another embodiment of the present disclosure, for speech recognition using dilation of speech content from a separated (or singular) audio input includes receiving, at a computer, a forecast audio input for a speaker, the forecast audio input including speech content for the speaker, as in block 604.

The method includes generating an environmental stimulus audio input for the forecast audio input, as in block 608.

The method includes predicting changes of the audio input for the speaker based on environmental stimulus audio input, as in block 612.

The method includes receiving an audio input and predicted changes for the audio input at a CNN (Convolutional Neural Network), the audio input having speech content from a speaker.

The method includes applying, in the CNN, diarization to the audio input to predict how a dilation of speech content from the speaker changes the audio input to generate a CNN output, as in block 620.

The method includes determining a resulting dilation from the CNN output, the resulting dilation of the CNN output includes separating the sounds of the audio input, as in block 622.

The method includes determining a word error rate for the dilated CNN output to determine accuracy numbers for speech to text outputs, as in block 624.

The method includes setting an adjustment parameter to change the potential range of the dilation based on the word error rate, as in block 628.

The method includes adjusting the resulting dilation of the CNN output based on the adjustment parameter to reduce the word error rate, as in block 632.

The method includes sharing the adjusted resulting dilating of the forecast audio input with a social network, as in block 636.

The method includes generating learning modifications from the sharing of the adjusted resulting dilating of the forecast audio input, as in block 640.

The method includes applying the learning modifications to the adjusted resulting dilating for the speaker, as in block 644.

The method includes identifying speech content from the speaker from the audio input based on the learning modifications applied to the adjusted resulting dilating for the speaker, as in block 648.

The method includes generating text from the identified speech content, as in block 652.

FURTHER EXAMPLES AND EMBODIMENTS

In the embodiment of the present disclosure shown in FIGS. 1 and 2, a computer can be part of a remote computer or a remote server, for example, remote server 1100 (FIG. 8). In another example, the computer 72 can be part of a control system 70 and provide execution of the functions of the present disclosure. In another embodiment, a computer 22 can be part of a mobile device 20 and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the mobile device 20 can include a computer 22 having a processor 15 and a storage medium 34 which stores an application 40. The application can incorporate program instructions for executing the features of the present disclosure using the processor 15. In another example, the mobile device 20 application 40 can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device 20 can communicate using a communications network 45, for example, the Internet.

Thereby, the method 100 according to an embodiment of the present disclosure, can be incorporated in one or more computer programs or an application 40 stored on an electronic storage medium 34, and executable by the processor 15, as part of the computer on the mobile device 20. For example, a human speaker or user 14 has a device 20, and the device can communicate with the control system 70. Other users (not shown) may have similar devices and communicate with the control system similarly. The application can be stored, all or in part, on a computer or a computer in a mobile device and at a control system communicating with the device, for example, using the communications network 45, such as the Internet. It is envisioned that the application can access all or part of program instructions to implement the method of the present disclosure. The program or application can communicate with a remote computer system via a communications network 45 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 13 and described in more detail in regards thereto referring to one or more computer systems 1010.

Thus, in one example, a control system 70 is in communication with the device(s) 20, and the device 20 can include the application 40. The device 20 communicates with the control system 70 using the communications network 45.

In another example, the control system 70 can have a front-end computer belonging to one or more users, such as the device 20, and a back-end computer embodied as the control system.

Also, referring to FIG. 1, the device 20 can include a computer 22, computer readable storage medium 34, and operating systems, and/or programs, and/or a software application 40, which can include program instructions executable using a processor 15. These features are shown herein in FIG. 1, and also in an embodiment of a computer system shown in FIG. 13 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer for implementing the features of the method according to the present disclosure. In another example, a computer for implementing the features of the method can be part of a mobile device and thus implement the method locally.

OTHER EXAMPLES AND EMBODIMENTS

It is understood that the features shown in FIGS. 11 and 12 are functional representations of features of the present disclosure. Such features are shown in embodiments of the systems and methods of the present disclosure for illustrative purposes to clarify the functionality of features of the present disclosure.

Specifically, regarding the control system 70, the device(s) 20 of one or more users 14 can be in communication with the control system 70 via the communications network 50. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, which also has access to the database 76.

The control system 70 can include a storage medium 80 for maintaining a registration 82 of users and their devices for analysis of the audio input. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 20 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

OTHER EXAMPLES AND EMBODIMENTS, AND DISCUSSION

It is understood that a set is a collection of distinct objects or elements. The objects or elements that make up a set can be anything, for example, numbers, letters of the alphabet, other sets, and so on. It is further understood that a set can be one element, for example, one thing or a number, in other words, a set of one element.

Figure 13:
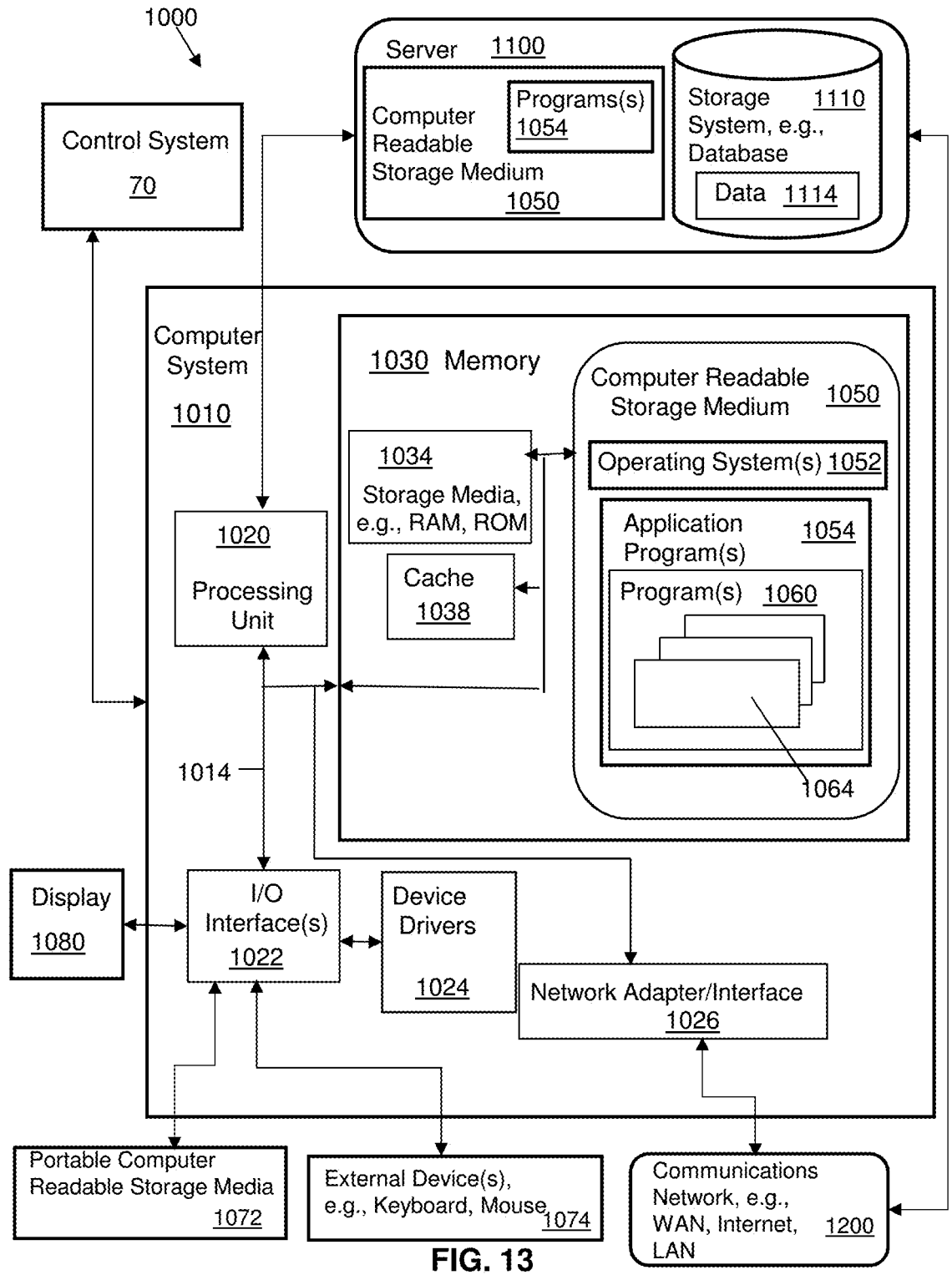
FIG. 13 is a schematic block diagram depicting a computer system according to an embodiment of the disclosure which may be incorporated, all or in part, in one or more computers or devices shown in FIG. 1, and cooperates with the systems and methods shown in FIGS. 1, 2, 3, 4, 5, 6, 7, 8, 9, 10, 11 and 12.

Referring to FIG. 13, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/ Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 14:
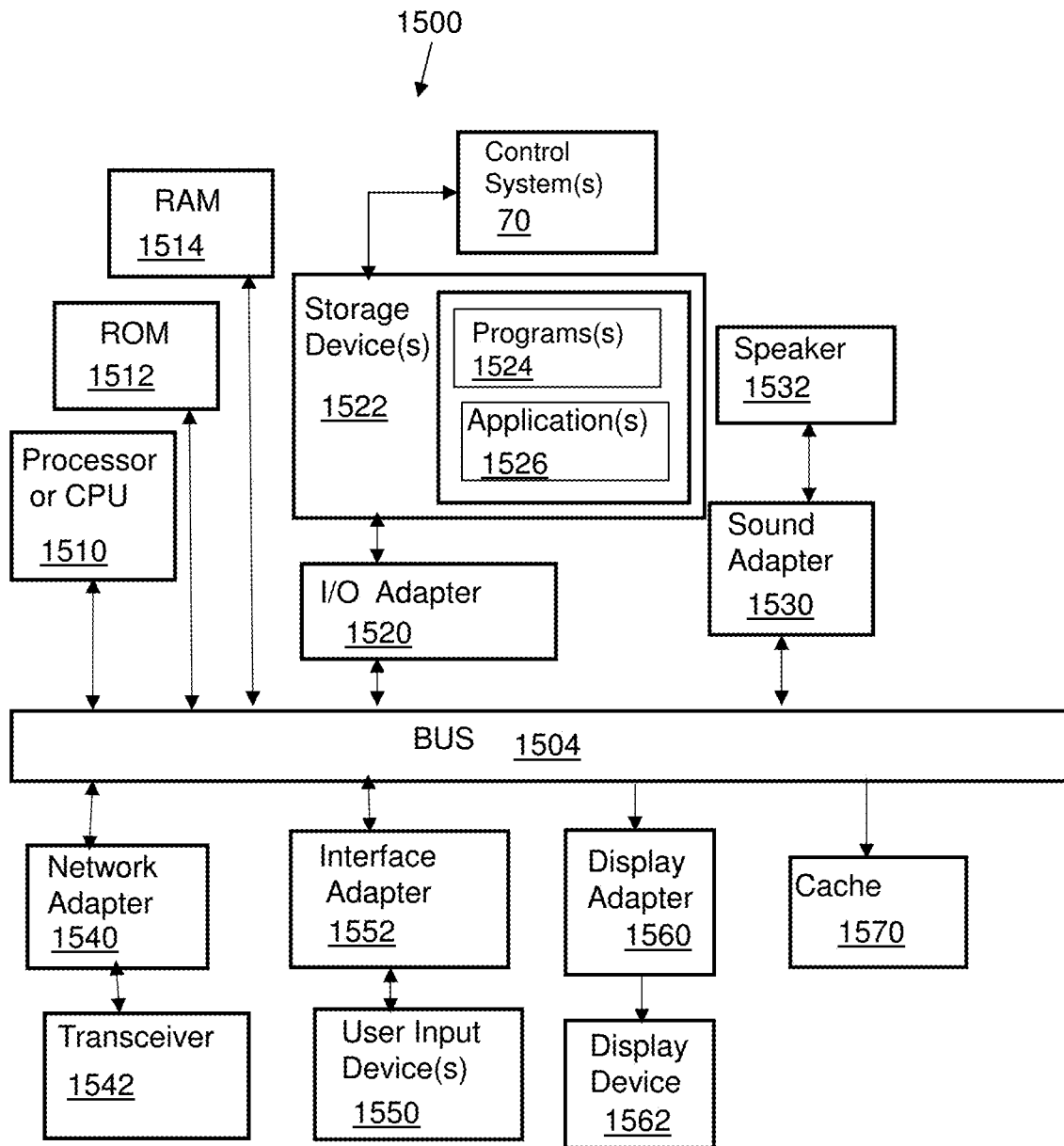
FIG. 14 is a schematic block diagram of a system depicting system components interconnected using a bus. The components for use, in all or in part, with the embodiments of the present disclosure, in accordance with one or more embodiments of the present disclosure.

Referring to FIG. 14, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
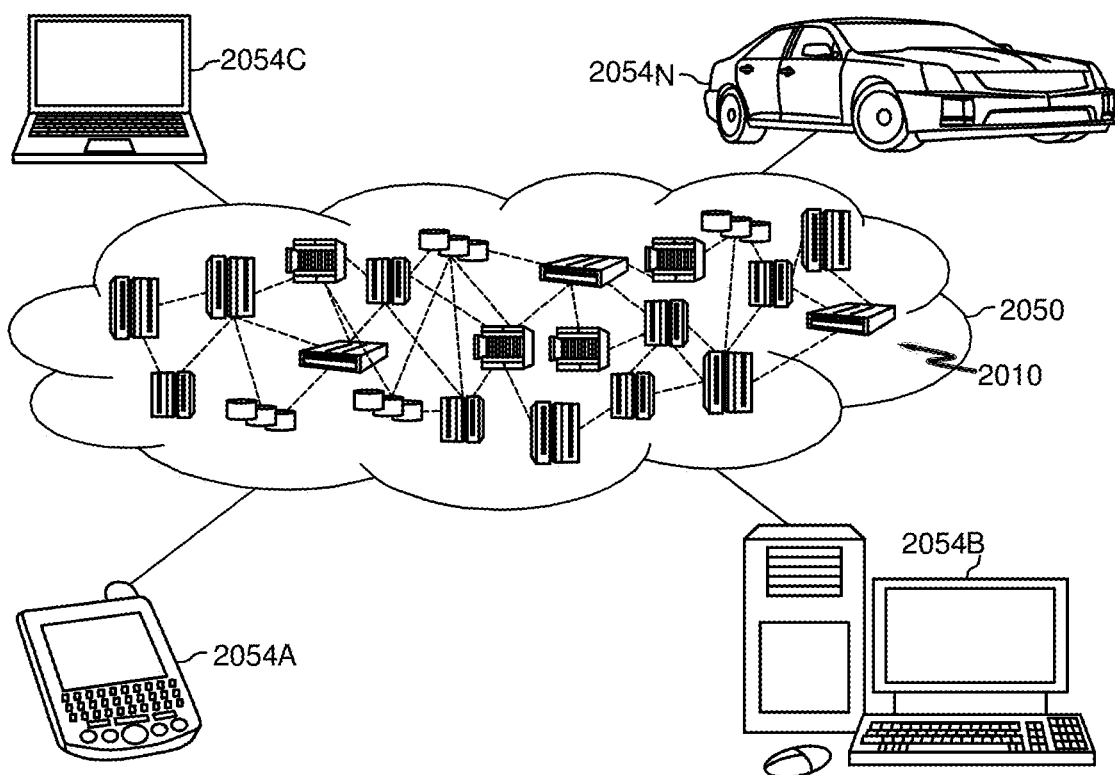
FIG. 15 is a block diagram depicting a cloud computing environment according to an embodiment of the present invention.

Referring now to FIG. 15, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 15 are intended to be illustrative only and that computing nodes 2010 and cloud computing environment 2050 can communicate with any type of computerized device over any type of network and/or network addressable connection (e.g., using a web browser).

Figure 16:
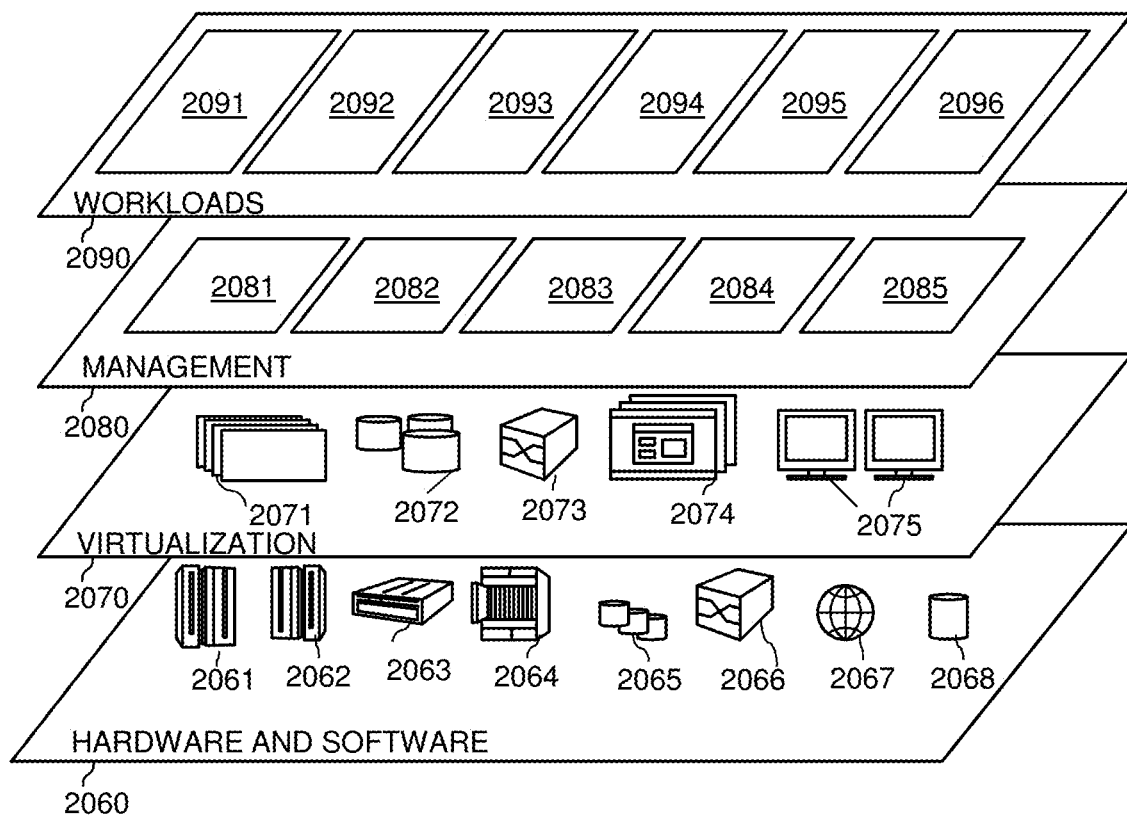
FIG. 16 is a block diagram depicting abstraction model layers according to an embodiment of the present invention.

Referring now to FIG. 16, a set of functional abstraction layers provided by cloud computing environment 2050 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and for speech recognition 2096, for example, more specifically, using dilation of speech content for speech recognition for an audio input from a separated audio input.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for speech recognition using dilation of speech content from a separated (singular) audio input, comprising:
   receiving an audio input, and receiving predicted changes for the audio input based on an external noise, at a CNN (Convolutional Neural Network), the audio input having speech content from a speaker;
   applying, in the CNN, diarization to the audio input to predict how a dilation of speech content from the speaker changes the audio input to generate a CNN output;
   determining a resulting dilation from the CNN output, the resulting dilation of the CNN output includes separating the sounds of the audio input;
   converting the sounds to text using the CNN;
   determining a word error rate for the dilated CNN output, using the text, to determine an accuracy for speech to text outputs;
   setting an adjustment parameter to change a range of the dilation based on the word error rate; and
   adjusting the resulting dilation of the CNN output based on the adjustment parameter to reduce the word error rate.

2. The method of claim 1, further comprising:
   identifying speech content from the speaker from the audio input based on a learning modifications applied to the adjusted resulting dilating for the speaker.

3. The method of claim 2, further comprising:
   generating text from the identified speech content.

4. The method of claim 1 wherein the audio input and the predicted changes are received without dilation of the speech content.

5. The method of claim 1, further comprising:
   adjusting the resulting dilating of the audio input based on the word error rate using a grid search to reduce the word error rate.

6. The method of claim 1, further comprising:
   receiving, at a computer, a forecast audio input for a speaker, the forecast audio input including speech content for the speaker;
   generating an environmental stimulus audio input for the forecast audio input; and
   predicting changes of the audio input for the speaker based on environmental stimulus audio input.

7. The method of claim 6, further comprising:
   sharing the adjusted resulting dilating of the forecast audio input with a social network;
   generating learning modifications from the sharing of the adjusted resulting dilating of the forecast audio input;
   applying the learning modifications to the adjusted resulting dilating for the speaker;

identifying speech content from the speaker from the audio input based on the learning modifications applied to the adjusted resulting dilating for the speaker; and
generating text from the identified speech content.

8. The method of claim 1, further comprising:
sharing the adjusted resulting dilating of the forecast audio input with a social network;
generating learning modifications from the sharing of the adjusted resulting dilating of the forecast audio input; and
applying the learning modifications to the adjusted resulting dilating for the speaker.

9. The method of claim 8, further comprising:
identifying speech content from the speaker from the audio input based on the learning modifications applied to the adjusted resulting dilating for the speaker.

10. The method of claim 9, further comprising:
generating text from the identified speech content.

11. The method of claim 1, further comprising:
receiving dilation parameters for speech content of one of a plurality of speakers at the CNN, the dilation parameters derived from an audio input from a plurality of speakers.

12. The method of claim 11, wherein the audio input from the plurality of speakers is an interlaced audio input.

13. A system for speech recognition using dilation of speech content from a separated audio input, which comprises:
a computer system comprising; a computer processor, a computer-readable storage medium, and program instructions stored on the computer-readable storage medium being executable by the processor, to cause the computer system to perform the following functions to;
receive an audio input, and receiving predicted changes for the audio input based on an external noise, at a CNN (Convolutional Neural Network), the audio input having speech content from a speaker;
apply, in the CNN, diarization to the audio input to predict how a dilation of speech content from the speaker changes the audio input to generate a CNN output;
determine a resulting dilation from the CNN output, the resulting dilation of the CNN output includes separating the sounds of the audio input;
converting the sounds to text using the CNN;
determine a word error rate for the dilated CNN output, using the text, to determine an accuracy for speech to text outputs;
set an adjustment parameter to change a range of the dilation based on the word error rate; and
adjust the resulting dilation of the CNN output based on the adjustment parameter to reduce the word error rate.

14. The system of claim 13, further comprising:
identifying speech content from the speaker from the audio input based on a learning modifications applied to the adjusted resulting dilating for the speaker.

15. The system of claim 14, further comprising:
generating text from the identified speech content.

16. The system of claim 13 wherein the audio input and the predicted changes are received without dilation of the speech content.

17. The system of claim 13, further comprising:
adjusting the resulting dilating of the audio input based on the word error rate using a grid search to reduce the word error rate.

18. The system of claim 13, further comprising:
receiving, at a computer, a forecast audio input for a speaker, the forecast audio input including speech content for the speaker;
generating an environmental stimulus audio input for the forecast audio input; and
predicting changes of the audio input for the speaker based on environmental stimulus audio input.

19. The system of claim 18, further comprising:
sharing the adjusted resulting dilating of the forecast audio input with a social network;
generating learning modifications from the sharing of the adjusted resulting dilating of the forecast audio input;
applying the learning modifications to the adjusted resulting dilating for the speaker;
identifying speech content from the speaker from the audio input based on the learning modifications applied to the adjusted resulting dilating for the speaker; and
generating text from the identified speech content.

20. The system of claim 13, further comprising:
sharing the adjusted resulting dilating of the forecast audio input with a social network;
generating learning modifications from the sharing of the adjusted resulting dilating of the forecast audio input; and
applying the learning modifications to the adjusted resulting dilating for the speaker.

21. The system of claim 20, further comprising:
identifying speech content from the speaker from the audio input based on the learning modifications applied to the adjusted resulting dilating for the speaker.

22. The system of claim 21, further comprising:
generating text from the identified speech content.

23. A computer program product for speech recognition using dilation of speech content from a separated audio input, the computer program product comprising a computer readable storage medium having program instructions embodied therewith, the program instructions executable by a computer to cause the computer to perform functions, by the computer, comprising the functions to:
receive an audio input, and receiving predicted changes for the audio input based on an external noise, at a CNN (Convolutional Neural Network), the audio input having speech content from a speaker;
apply, in the CNN, diarization to the audio input to predict how a dilation of speech content from the speaker changes the audio input to generate a CNN output;
determine a resulting dilation from the CNN output, the resulting dilation of the CNN output includes separating the sounds of the audio input;
converting the sounds to text using the CNN;
determine a word error rate for the dilated CNN output, using the text, to determine an accuracy for speech to text outputs;
set an adjustment parameter to change a range of the dilation based on the word error rate; and
adjust the resulting dilation of the CNN output based on the adjustment parameter to reduce the word error rate.

24. The computer program product of claim 23, further comprising:
identifying speech content from the speaker from the audio input based on a learning modifications applied to the adjusted resulting dilating for the speaker.

25. The computer program product of claim 24, further comprising:
generating text from the identified speech content.

* * * * *